US012049841B2

(12) United States Patent
Zoeller

(10) Patent No.: US 12,049,841 B2
(45) Date of Patent: Jul. 30, 2024

(54) BURNER FOR A MOTOR VEHICLE

(71) Applicant: Mercedes-Benz Group AG, Stuttgart (DE)

(72) Inventor: Herbert Zoeller, Stuttgart (DE)

(73) Assignee: Mercedes-Benz Group AG, Stuttgart (DE)

( * ) Notice: Subject to any disclaimer, the term of this patent is extended or adjusted under 35 U.S.C. 154(b) by 0 days.

(21) Appl. No.: 18/551,798

(22) PCT Filed: Mar. 22, 2022

(86) PCT No.: PCT/EP2022/057445
§ 371 (c)(1),
(2) Date: Sep. 21, 2023

(87) PCT Pub. No.: WO2022/200322
PCT Pub. Date: Sep. 29, 2022

(65) Prior Publication Data

US 2024/0175386 A1 May 30, 2024

(30) Foreign Application Priority Data

Mar. 25, 2021 (DE) ..................... 10 2021 001 584.3

(51) Int. Cl.
*F01N 3/20* (2006.01)
*H01T 13/16* (2006.01)

(52) U.S. Cl.
CPC ........... *F01N 3/2033* (2013.01); *F01N 3/204* (2013.01); *H01T 13/16* (2013.01)

(58) Field of Classification Search
CPC ............. F23D 1/02; F23D 2900/11402; F23D 11/383; F23D 2203/007; F23D 2900/14002; F23D 14/62; F01N 3/025; F01N 3/2033; F01N 2240/20; F01N 3/204; F01N 2610/1453; F01N 2470/00; F01N 2470/24; F01N 2240/14
See application file for complete search history.

(56) References Cited

U.S. PATENT DOCUMENTS

| | | | |
|---|---|---|---|
| 4,602,571 | A | 7/1986 | Chadshay |
| 4,951,464 | A | 8/1990 | Eickhoff et al. |

FOREIGN PATENT DOCUMENTS

| | | | |
|---|---|---|---|
| DE | 37 29 861 | C2 | 3/1989 |
| EP | 1 731 837 | A2 | 12/2006 |
| WO | WO 2010/022747 | A1 | 3/2010 |

OTHER PUBLICATIONS

PCT/EP2022/057445, International Search Report dated May 23, 2022 (Two (2) pages).

(Continued)

*Primary Examiner* — Anthony Ayala Delgado
(74) *Attorney, Agent, or Firm* — Crowell & Moring LLP

(57) ABSTRACT

A burner for an exhaust gas tract that can be flowed through by exhaust gas of an internal combustion engine includes a combustion chamber, in which a mixture comprising air and a liquid fuel is to be ignited and thus to be combusted, and an inner swirl chamber that can be flowed through by a first part of the air. The inner swirl chamber has a first swirl generation device via which a turbulent flow of the first part of the air can be caused and a first outflow opening that can be flowed through by the first part of the air flowing through the inner swirl chamber. The first part of the air being able to be removed from the inner swirl chamber via the first outflow opening.

10 Claims, 14 Drawing Sheets

(56) References Cited

OTHER PUBLICATIONS

German-language German Office Action issued in German application No. 10 2021 001 584.3 dated Nov. 19, 2021 (Six (6) pages).
German-language German Office Action issued in German application No. 10 2021 001 584.3 dated Jun. 6, 2023 (Six (6) pages).
U.S. Patent Application, "Method for Operating a Burner of a Motor Vehicle", filed on Sep. 21, 2023, Inventor Herbert Zoeller.
U.S. Patent Application, "Burner for a Motor Vehicle and Motor Vehicle Having at Least One Such Burner", filed on Sep. 21, 2023, Inventor Herbert Zoeller.

BURNER FOR A MOTOR VEHICLE

BACKGROUND AND SUMMARY OF THE INVENTION

The invention relates to a burner for an exhaust gas tract that can be flowed through by exhaust gas of an internal combustion engine of a motor vehicle.

Motor vehicles having internal combustion engines and exhaust gas systems, which are also described as exhaust gas tracts, are known from the general prior art and in particular from series vehicle construction. The respective exhaust gas tract can be flowed through by exhaust gas of the respective internal combustion engine, also described as an internal combustion motor. In some operating states or operating situations of the respective internal combustion engine, a high temperature of the exhaust gas can be desirable, for example to be able to quickly heat and/or keep warm an exhaust gas aftertreatment device arranged in the exhaust gas tract, wherein, however, the temperature of the exhaust gas is only insufficiently high in these operating states or situations.

DE 37 29 861 C2 discloses a burner for an exhaust gas tract that can be flowed through by exhaust gas of an internal combustion engine of a motor vehicle, having a combustion chamber in which a mixture comprising air and a liquid fuel is to be ignited and thus to be combusted. The burner has an inner swirl chamber that can be flowed through by a first part of the air and that causes a turbulent flow of the first part of the air, and that has a first outflow opening via which the first part of the air can be removed from the inner swirl chamber. The liquid fuel can be introduced into the inner swirl chamber by means of an introduction element. A second swirl chamber surrounds the inner swirl chamber in the peripheral direction at least in a longitudinal region. The second swirl chamber is flowed through by a second part of the air and causes a turbulent flow of the second part of the air. The second swirl chamber has a second outflow opening via which the second part of the air and the first part of the air and the liquid fuel can be introduced into the combustion chamber out of the inner swirl chamber.

The object of the present invention is thus to create a burner for an exhaust gas tract of a motor vehicle, such that a particularly advantageous mixture preparation can be obtained.

A first aspect of the invention relates to a burner for an exhaust gas tract that can be flowed through by exhaust gas of an internal combustion engine, also described as an internal combustion motor, of a motor vehicle. This means that in its completely produced state, the motor vehicle, which can preferably be designed as a motor car and particularly preferably as a passenger car, has the internal combustion engine and the exhaust gas tract and can be driven by means of the internal combustion engine. During a fired operation of the internal combustion engine, combustion processes take place in the internal combustion engine, in particular in at least one or several combustion chambers of the internal combustion engine, resulting in the exhaust gas of the internal combustion engine. The exhaust gas can flow out of the respective combustion chamber and into the exhaust gas tract, and consequently flow through the exhaust gas tract, which is also described as an exhaust gas system. At least one component, e.g., an exhaust gas aftertreatment element for aftertreating the exhaust gas, can be arranged in the exhaust gas tract. The exhaust gas aftertreatment element is a catalytic converter, for example, in particular an SCR catalytic converter, wherein for example a selective catalytic reduction (SCR) can be catalytically supported and/or caused by means of the SCR catalytic converter. In the selective catalytic reduction, nitrogen oxides potentially contained in the exhaust gas are at least partially removed from the exhaust gas, as the nitrogen oxides react with ammonia in the selective catalytic reduction to form nitrogen and water. For example, the ammonia is provided by an in particular liquid reduction agent. The exhaust gas aftertreatment element can also be or comprise a particle filter, in particular a diesel particle filter, by means of which particles contained in the exhaust gas, in particular soot particles, can be filtered out of the exhaust gas.

The burner has a combustion chamber in which a mixture that comprises air and a liquid fuel can be ignited and thus combusted. By combusting the mixture, exhaust gas of the burner, in particular of the combustion chamber, is generated, of which the exhaust gas is also described as burner exhaust gas. The burner exhaust gas can for example flow out of the combustion chamber and into the exhaust gas tract, in particular at an introduction point, which is for example arranged upstream of the component in the flow direction of the exhaust gas of the internal combustion engine flowing through the exhaust gas tract.

The burner exhaust gas can consequently flow through the component, for example, whereby the component can be heated, i.e., warmed. It is further conceivable that the burner exhaust gas can flow out of the combustion chamber and into the exhaust gas tract, and is thus mixed with the exhaust gas of the internal combustion engine flowing through the exhaust gas tract and/or with a gas flowing through the exhaust gas tract, whereby the exhaust gas of the internal combustion engine or the gas is warmed. In other words, a particularly high temperature, also described as an exhaust gas temperature, of the exhaust gas of the internal combustion engine or of the gas can thus be obtained. The component can be warmed by the high exhaust gas temperature, as the exhaust gas or the gas flows through the component. Thus, for example, the exhaust gas from the combustion chamber is introduced into the exhaust gas tract at the previously specified introduction point, and thus into the exhaust gas or gas flowing through the exhaust gas tract. For example, an ignition device that can in particular be operated electrically is arranged in the combustion chamber, by means of which, for example, at least one ignition spark can be provided, i.e., generated, for igniting the mixture, in particular in the combustion chamber and/or using electrical energy or the current. The ignition device, for example, is a glow plug or a spark plug.

The burner has an inner swirl chamber that can be flowed through by a first part of the air forming the mixture and that causes a turbulent flow of the first part of the air, the inner swirl chamber thus preferably being arranged upstream of the combustion chamber in the flow direction of the first part of the air flowing through the inner swirl chamber. The inner swirl chamber has in particular exactly one first outflow opening that can be flowed through by the first part of the air flowing through the inner swirl chamber and via which the first part of the air flowing through the first outflow opening can be removed from the inner swirl chamber and for example introduced into the combustion chamber. The feature that the inner swirl chamber causes or can cause a turbulent flow of the first part of the air flowing through the inner swirl chamber should in particular be understood to mean that the first part of the air flows through the swirl chamber in a turbulent manner, and thus flows through at least one longitudinal region of the swirl chamber in a turbulent manner and/or the first part of the air only has its turbulent flow at least in a first flow region arranged downstream of the inner swirl chamber and outside of the inner swirl chamber, which first flow region is for example arranged in the combustion chamber. It is in particular conceivable that the first part of the air flows out of the inner swirl chamber via the first outflow opening in a turbulent manner and/or flows into the combustion chamber in a turbulent manner, such that it is particularly preferably provided that the first part of the air has its turbulent flow at least in the combustion chamber.

The burner additionally has an introduction element, in particular an injection element, which has at least or exactly one exit opening that can be flowed through by the liquid fuel. The exit opening is arranged in the inner swirl chamber, such that the introduction element, in particular the injection element, or a conduit of the introduction element that can be flowed through by the liquid fuel leads into the inner swirl chamber via the exit opening. By means of the introduction element, the fuel flowing through the exit opening can be introduced, in particular injected, in particular directly, into the inner swirl chamber via the exit opening, such that the first outflow opening can also be flowed through by the liquid fuel that has exited, in particular been injected out of the introduction element via the exit opening and has thus been introduced, in particular injected into the inner swirl chamber, in particular directly. In particular, this means that the first part of the air and the fuel can flow through the first outflow opening along a shared first flow direction and can thus flow out of the inner swirl chamber.

The burner further comprises an outer swirl chamber that surrounds at least one longitudinal region of the inner swirl chamber and preferably also the first outflow opening in the peripheral direction of the inner swirl chamber, in particular completely continuously. For example, the peripheral direction of the inner swirl chamber runs around the previously specified first flow direction, which coincides for example with the axial direction of the inner swirl chamber and thus the first outflow opening. It is preferably provided that the inner swirl chamber ends on the first outflow opening or on the end of the latter in the flow direction of the first part flowing through the first outflow opening and thus in the flow direction of the fuel flowing through the first outflow opening, and thus in the axial direction of the inner swirl chamber and thus the first outflow opening. The outer swirl chamber can be flowed through by a second part of the air, and is designed to cause a turbulent flow of the second part of the air. This should in particular be understood to mean that the second part of the air flows into the outer swirl chamber, and thus flows through at least one part or longitudinal region of the outer swirl chamber in a turbulent manner, and/or the second part of the air has its turbulent flow in a second flow region arranged downstream of the outer swirl chamber in the flow direction of the second part of the air flowing through the outer swirl chamber, the second flow region for example coinciding with the previously specified first flow region, wherein the second flow region can for example be arranged outside of the outer swirl chamber and for example within the combustion chamber. It is further conceivable that the previously specified first flow region is arranged outside of the outer swirl chamber. In other words again, it is conceivable that the second part of the air flows out of the outer swirl chamber in a turbulent manner and/or flows into the combustion chamber in a turbulent manner, such that it is preferably provided that the second part of the air has its turbulent flow at least in the combustion chamber.

The outer swirl chamber has in particular exactly one second outflow opening that can be flowed through by the second part of the air flowing through the outer swirl chamber, by the fuel flowing through the first outflow opening and by the first part of the air flowing through the inner swirl chamber and the first outflow opening, and that is for example arranged downstream of the first outflow opening in the flow direction of the parts and the fuel, the second part of the air being able to be removed from the outer swirl chamber and the parts of the air and the fuel being able to be introduced into the combustion chamber via the second outflow opening. In particular, the parts of the air and the fuel can flow along a second flow direction through the second outflow opening, and thus via the second outflow opening into the combustion chamber, wherein for example the second flow direction runs in parallel with the first flow direction or coincides with the first flow direction. It is further preferably provided that the second flow direction runs in the axial direction of the outer swirl chamber, and thus coincides with the axial direction of the outer swirl chamber, such that it is preferably provided that the axial direction of the inner swirl chamber corresponds to the axial direction of the outer swirl chamber or vice versa. In other words, it is preferably provided that the axial direction of the inner swirl chamber coincides with the axial direction of the outer swirl chamber or vice versa. The respective radial direction of the respective swirl chamber runs perpendicular to the respective axial direction of the respective swirl chamber. For example, as the second outflow opening is arranged downstream of the first outflow opening along the respective flow direction, i.e., in the flow direction of the respective part of the air and in the flow direction of the fuel, and as the outer swirl chamber preferably surrounds the first outflow opening, the first outflow opening is for example arranged in the outer swirl chamber. In particular, it is conceivable that the outer swirl chamber ends on the second outflow opening, in particular on the end of the latter, in particular in the flow direction of the second part of the air flowing through the second outflow opening.

For example, to generate the respective turbulent flow, the respective swirl chamber can have at least one or several swirl generators, by means of which the respective turbulent flow can be or is generated. The respective swirl generator is in particular arranged in the respective swirl chamber. In particular, the swirl generator can for example be a guide vane, by means of which, for example, the respective part, i.e., the respective air forming the respective part, is diverted at least or exactly once, in particular by at least or exactly 70 degrees, in particular by approx. 90 degrees, i.e., for example, by 70 to 90 degrees. The turbulent flow should in particular be understood to mean a flow that extends turbulently or at least substantially helically or as a helix around the respective axial direction of the respective swirl chamber or the respective outflow opening. In particular, the respective axial direction of the respective outflow opening runs perpendicular to a plane in which the respective outflow opening runs. For example, the respective axial direction of the respective outflow opening coincides with the respective axial direction of the respective swirl chamber. The respective outflow opening is for example also described as a respective nozzle, of which the cross-section, which can be flowed through by the respective part of the air, need not, however, necessarily taper along the respective flow direction. Thus, for example, the second outflow opening is also described as an outer nozzle or second nozzle, whereby, for example, the first outflow opening is also described as an inner nozzle or first nozzle.

By causing the respective turbulent flow, the air can particularly advantageously be mixed with the liquid fuel, in particular even only over a small mixing path, in particular in the combustion chamber, such that a particularly advantageous mixture preparation can be obtained, i.e., the mixture can be formed particularly advantageously. In particular, the fuel can first be mixed with the first part of the air particularly well, in particular in the inner swirl chamber, in particular due to the turbulent flow of the first part, in particular in the inner swirl chamber. Additionally, the fuel and also, for example, the first part that has already mixed with the fuel can be particularly advantageously mixed with the second part of the air, in particular in the outer swirl chamber and/or in the combustion chamber, as the second part of the air also has an advantageous turbulent flow. Overall, the parts of the air and the fuel can be mixed particularly advantageously due to the turbulent flows, such that an advantageous mixture preparation can be produced.

The inner swirl chamber has a first inner swirl generation device, by means of which the first turbulent flow of the first part of the air can be caused. The outer swirl chamber further has an outer second swirl generation device, by means of which the second turbulent flow of the second part of the air can be caused. For example, the swirl generation devices form a swirl generation apparatus or the swirl generation devices are components of a swirl generation apparatus of the burner. It is in particular conceivable that the swirl generation devices are formed as one part with one another or are formed by a single-part component element. For example, the first swirl generation device has at least one or several first swirl generation elements, e.g., preferably first guide vanes, by means of which the air or the first part of the air can advantageously be guided or deflected or diverted such that the turbulent flow of the first part of the air can be caused, i.e., is caused. As an alternative or in addition, it is conceivable that the second swirl generation device comprises at least one or several second swirl generation elements, such as preferably second guide vanes, by means of which the air or the second part of the air can be guided or deflected or diverted such that the second turbulent flow of the second part of the air can be caused, i.e., is caused. It is preferably provided that the swirl generation elements of the respective swirl generation device are arranged one after the other and/or spaced apart from one another in the peripheral direction of the respective swirl chamber in particular running around the respective axial direction of the respective swirl chamber.

To obtain a particularly advantageous preparation or formation of the mixture also described as mixture preparation, and thus to be able to heat and/or keep warm the components particularly quickly and efficiently, the burner additionally has a dividing wall that has at least one longitudinal region arranged or running upstream of the swirl generation devices in the flow direction of the parts of the air flowing through the swirl chambers and thus in the flow direction of the air flowing through the swirl chambers. The dividing wall and thus the longitudinal region is preferably designed as a solid body. Via the dividing wall, an inner air feed chamber, which is assigned to the inner swirl chamber, arranged upstream of the first swirl generation device in the flow direction of the first part of the air flowing through the inner swirl chamber, and via which the first part of the air can be fed to the inner swirl chamber, is separated, except for at least or preferably exactly one overflow opening formed in the longitudinal region of the dividing wall and designed as a through opening, from an outer air feed chamber which is assigned to the outer swirl chamber, is arranged upstream of the second swirl generation device in the flow direction of the second part of the air flowing through the outer swirl chamber, can be or preferably is, in particular permanently, fluidically connected to the outer air feed chamber via the overflow opening and in particular completely continuously surrounds the inner air feed chamber in the peripheral direction of the respective swirl chamber, the second part of the air being able to be fed to the outer swirl chamber via the outer air feed chamber. The outer air feed chamber is thus delimited inwards in the radial direction of the respective swirl chamber, in particular directly, by the dividing wall, in particular by a lateral surface on the external periphery of the dividing wall, wherein for example the outer air feed chamber is delimited outwards in the radial direction of the respective swirl chamber, in particular directly, by a component element of the burner for example designed or functioning as a chamber element, and in particular designed as a solid body, in particular by a lateral surface on the internal periphery of the chamber element, in particular directly. The inner air feed chamber is for example delimited outwards in the radial direction of the respective swirl chamber, in particular directly, by the dividing wall, in particular by a lateral surface on the internal periphery of the dividing wall.

The burner additionally has a feeding conduit that can be flowed through by the air and leading, in particular directly, into the outer air feed chamber, via which feeding conduit the air can be introduced into the outer air feed chamber. The second part of the air can be transferred and thus introduced via the overflow opening into the inner air feed chamber from or out of the outer air feed chamber, whereby the air introduced into the outer air feed chamber can be divided into the parts. In other words, a part of the air introduced into the outer air feed chamber via the feeding conduit can flow through the overflow opening and thus flow out of the outer air feed chamber into the inner air feed chamber, wherein the latter is a part of the first part of the air. The air remaining in the outer air feed chamber and flowing from there into the outer swirl chamber is the second part of the air. The air can thus be particularly advantageously divided into the parts and fed to the swirl chambers via the dividing wall, such that the air can be particularly advantageously mixed with the fuel. It is in particular provided that the radial direction of the respective swirl chamber runs perpendicular to the axial direction of the respective swirl chamber, of which the respective axial direction preferably coincides with the or with a respective flow direction, along which the air or the respective part of the air flows through the respective swirl chamber or through the respective outflow opening.

The respective air feed chamber is for example a respective prechamber, or the air feed chambers form a prechamber when viewed as a whole, whereby the air can be particularly advantageously divided into the parts via the prechamber, such that the air can consequently be particularly effectively mixed with the fuel. Consequently, a particularly advantageous preparation of the mixture can be guaranteed, such that a particularly efficient and thus low-fuel consumption operation of the burner can be represented.

In a further embodiment of the invention, the introduction element has at least or exactly one or several exit openings that can be flowed through by the fuel. Via the respective exit opening, the fuel can be removed from the introduction element, can in particular be injected out of the introduction element for example designed or functioning as an injection element. By removing the liquid fuel from the introduction element, the fuel removed from the introduction element and thus provided by the introduction element can be introduced, in particular injected, into the inner swirl chamber.

It has proved particularly advantageous in this case if the introduction element, i.e., a fuel conduit of the introduction element that can be flowed through by the liquid fuel and also simply described as a conduit, leads directly into the inner air feed chamber via the exit opening.

As the outer air feed chamber surrounds the inner air feed chamber, and as the air feed chambers are fluidically connected to each other via the overflow opening, and as the feeding conduit leads, in particular directly, into the outer air feed chamber, the air feed chambers are arranged connected to one another in particular serially, i.e., in series, in the flow direction of the air flowing from the feeding conduit via the air feed chambers to and into the swirl chambers, in particular such that the inner air feed chamber is arranged downstream of the outer air feed chamber. In other words, the inner air feed chamber is supplied with the air or with the first part of the air via the outer air feed chamber via the overflow opening, whereby the air can be particularly advantageously divided.

For example, it is provided that the overflow opening and the feeding conduit, in particular a conduit opening of the feeding conduit which leads, in particular directly, into the outer air feed chamber via its conduit opening, are arranged at least partially, in particular at least substantially or completely, at the same height in the peripheral direction of the respective air feed chamber, such that, for example, the feeding conduit or the conduit opening is overlapped or covered inwards in the radial direction of the respective air feed chamber at least partially, in particular at least substantially or completely, by the overflow opening. The peripheral direction of the respective air feed chamber runs around the respective axial direction of the respective air feed chamber, of which the axial direction coincides with the respective axial direction of the respective swirl chamber.

So that a particularly advantageous mixture preparation can be obtained, it is provided in a further embodiment of the invention that a guidance body facing the introduction element, in particular in the axial direction of the respective air feed chamber or of the respective swirl chamber, is arranged in the inner air feed chamber, which guidance body is arranged between the first swirl generation device in the radial direction of the inner swirl chamber, and thus in the radial direction of the outer swirl chamber, i.e., in the radial direction of the respective air feed chamber. This should in particular be understood to mean that, for example, the first swirl generation elements are arranged distributed around, in particular equally, in the peripheral direction of the inner air feed chamber, and thus in the peripheral direction of the first swirl chamber, and thus in particular in the peripheral direction of the guidance body, in particular over its periphery. In other words, for example, the first swirl generation elements follow one after the other in the peripheral direction of the guidance body and thus in the peripheral direction of the respective swirl chamber and in the peripheral direction of the respective air feed chamber. The guidance body, i.e., in particular a guidance surface of the guidance body facing the introduction element, in particular in the axial direction of the respective air feed chamber and thus in the axial direction of the respective swirl chamber, is preferably convexly domed towards the introduction element and arranged at least partially upstream of the first swirl generation device. The guidance body, in particular the guidance surface, is preferably arranged rotationally symmetrically with regard to the respective axial direction of the respective air feed chamber, and thus with regard to the respective axial direction of the respective swirl chamber. The air, i.e., in particular the first part of the air, that flows towards the guidance body or the guidance surface in the axial direction of the respective swirl chamber to the respective swirl chamber can thus be particularly advantageously guided or fed by means of the guidance body, in particular to the first swirl generation elements. The air can thus be guided by the guidance body in a manner particularly favourable to flow, such that a particularly advantageous mixture preparation can be represented.

A further embodiment is characterized in that the first outflow opening ends in the flow direction of the first part of the air flowing through the first outflow opening on an end edge machined in a targeted manner that is formed by an atomizing lip, designed in particular as a solid body, that tapers in the flow direction of the first part of the air flowing through the first outflow opening up to the end edge and ends on an end edge.

In other words, so that the component, for example designed as an exhaust gas aftertreatment device or as an exhaust gas aftertreatment system, can be particularly quickly and efficiently heated, in particular even if the exhaust gas of the internal combustion engine only has a low temperature, it is preferably provided that the first outflow opening (first or inner nozzle) ends in the flow direction of the first part of the air flowing through the first outflow opening, and thus in the flow direction of the fuel flowing through the first outflow opening, on an end edge that has been machined in a targeted manner and is thus sharp or knife-sharp and that is formed by an atomizing lip in particular designed as a solid body, which tapers up to the end edge in the flow direction of the first part of the air flowing through the first outflow opening and thus in the flow direction of the fuel flowing through the first outflow opening and ends on the end edge. This means that the atomizing lip has a taper tapering in the first flow direction and thus in particular towards the combustion chamber that ends, in particular only ends on the end edge. Thus, and in particular due to the targeted machining of the end edge, the taper or the atomizing lip is sharp-edged. In other words, the atomizing lip ends in a sharp edge, whereby a particularly advantageous mixture preparation can be produced.

For example, the mixture is combusted in the combustion chamber while forming a flame, wherein the fuel can in particular be advantageously mixed with the air via the turbulent flow, and wherein the flame of the combustion chamber can advantageously be stabilized in particular due to the turbulent flows. For this purpose, a combustion-induced bursting of vortices can be generated, in particular via the turbulent flows. For this purpose, for example, the air flowing into the combustion chamber in the respective swirl chamber is first deflected by approximately 70 degrees or by approximately 90 degrees, in particular in a range from 70 degrees to 90 degrees, which can for example be realized via the respective swirl generator. For example, the inner swirl chamber and the outer swirl chamber form a swirl chamber also described as a total swirl chamber, which is sub-divided in the invention into the inner swirl chamber and the outer swirl chamber. The inner swirl chamber and the outer swirl chamber are preferably separated by a dividing wall in particular designed as a solid body, in particular in the radial direction of the respective swirl chamber. It is conceivable that the dividing wall surrounds at least the specified longitudinal region of the inner swirl chamber in the peripheral direction of the inner swirl chamber running around the axial direction of the inner swirl chamber, in particular completely continuously, such that for example at least the longitudinal region of the inner swirl chamber is formed or delimited outwards in the radial direction of the inner swirl chamber, in particular directly, by the dividing wall. It is further conceivable that at least a second longitudinal region of the outer swirl chamber is formed or delimited inwards in the radial direction of the outer swirl chamber, in particular directly, by the dividing wall. It is in particular conceivable that the longitudinal regions of the swirl chambers are arranged at the same height in the axial direction of the respective swirl chamber. During an operation of the burner, only air, i.e., only the second part of the air, flows through the outer swirl chamber, while or wherein air, i.e., the first part, and the liquid fuel flow through the inner swirl chamber. The fuel can thus already be advantageously mixed with the first part of the air in the inner swirl chamber. The introduction element, in particular the injection element, can be an injection nozzle, of which the outflow opening is for example arranged in or on an end face or end surface of the injection element, of which the end face or end surface runs in an end face or end surface plane running perpendicular to the axial direction of the respective swirl chamber. It is further conceivable that the introduction element is designed as a lance, which has a longitudinal extension that coincides for example with the respective axial direction of the respective swirl chamber or the respective outflow opening. For example, the lance has at least or exactly, in particular at least or exactly two exit openings, which can be designed as holes, in particular as transverse holes. The exit opening has a through direction along which the fuel can flow through the exit opening. In particular, if the introduction element is designed as an injection nozzle, the through direction of the exit opening runs in parallel with the respective axial direction of the respective swirl chamber or the through direction coincides with the respective axial direction of the respective swirl chamber or the respective outflow opening. In particular, if the introduction element is designed as a lance, the through direction runs obliquely or preferably perpendicular to the axial direction of the respective swirl chamber or the respective outflow opening.

It is in particular conceivable that at least the inner swirl chamber is formed by a component in particular designed as a solid body, which also forms the atomizing lip and thus the end edge. In particular, a lateral surface of the component on the internal periphery delimits the inner swirl chamber outwards in the radial direction of the inner swirl chamber. The component, in particular its lateral surface on the internal periphery, is or functions for example as a prefilmer between the swirl chambers, and thus between the turbulent and thus swirled flows, also described as air flows. It is in particular conceivable that the lateral surface on the internal periphery or the prefilmer is formed by the previously specified dividing wall or that the component forms or has the previously specified dividing wall. By means of the introduction element, the fuel flowing through the exit opening and that has thus exited, in particular been injected, out of the injection element is applied to the prefilmer, in particular to the lateral surface on the internal periphery, in particular as a film also described as a fuel film or is atomized on the prefilmer between the two swirled air flows. Due to centrifugal forces resulting from the turbulent flow of the first part of the air, the fuel that has exited, in particular been injected, out of the introduction element, and has thus been introduced, in particular injected, i.e., sprayed, in particular directly into the inner swirl chamber, in particular as the previously specified film, is applied to the prefilmer, in particular to the lateral surface on the internal periphery, and flows or streams downstream to the first outflow opening, also described as a nozzle opening, and thus to the end edge. The fuel is thus applied to the atomizing lip and fed or transported to the end edge. According to the invention, the first outflow opening ends on the knife-sharp end edge, which has or provides only a small surface area due to the previously described tapering, such that no excessively large droplets of the fuel can form on the end edge. Due to the configuration according to the invention of the atomizing lip and in particular of the end edge, only tiny little droplets of the fuel break away on the end edge. In other words, only particularly small, i.e., tiny, droplets arise from the previously specified fuel film at the end edge, which break away on the end edge, in particular from the atomizing lip or from the component, and have a correspondingly large surface area. This effect leads to a particularly low-soot combustion of the mixture in the combustion chamber. Tiny droplets of the fuel can thus be generated even without high injection pressures of the fuel generated with significant effort and without high-cost injection elements, such that, on the one hand, the costs of the burner can be kept particularly low. On the other hand, particularly small droplets of the fuel can be generated, such that very low output of the burner can also be represented. The invention is in particular based on the knowledge that conventional burners have an excessively high pressure loss and are unsuitable for low outputs, and thus disadvantageous with regard to fuel consumption. The previously specified problems and disadvantages can now be avoided via the invention, such that in particular the fuel consumption can be kept low. Where the injection element is mentioned in the following, this should be understood to mean the introduction element.

Where the gas flowing through the exhaust gas tract is mentioned in the following, this should be understood to mean the previously specified exhaust gas of the internal combustion engine or the previously specified gas, if nothing else is specified. It is conceivable that the previously specified introduction point at which the burner exhaust gas is introduced into the exhaust gas tract or into the gas is arranged downstream or upstream of an oxidation catalyst, for example designed as a diesel oxidation catalyst, of the exhaust gas tract in the flow direction of the gas flowing through the exhaust gas tract. The oxidation catalyst is in particular designed to oxidize unburned hydrocarbons (HC) potentially contained in the exhaust gas and/or to oxidize carbon monoxides (CO) potentially contained in the exhaust gas, in particular into carbon dioxide.

To generate particularly small droplets of the fuel by means of the end edge, in an embodiment of the invention it is provided that the end edge is mechanically machined in a targeted manner. The feature that the end edge is in particular mechanically machined in a targeted manner should in particular be understood to mean that the end edge does not have a machined finish that can be formed in any way or provided in any way, and instead the end has been or is machined during production of the burner, in particular mechanically, in a targeted manner and thus as desired.

A further embodiment is characterized in that the end edge is rotated, i.e., machined while rotating, and/or is thus mechanically machined. Particularly small droplets of the fuel can thus be generated by means of the end edge.

So that a particularly effective operation of the burner, and consequently a particularly effective mixture preparation can be obtained, it is provided in a further embodiment of the invention that at least one longitudinal region of the introduction element is surrounded in the peripheral direction of the introduction element, and thus in the peripheral direction of the respective swirl chamber and in the peripheral direction of the respective air feed chamber by a cooling jacket, in particular completely continuously, the cooling jacket being able to be flowed through by a cooling fluid to cool the introduction element.

It has proved particularly advantageous if the cooling fluid is a cooling liquid. A particularly effective heat removal can thus be guaranteed. The cooling liquid preferably comprises, in particular at least substantially or completely, water, whereby a particularly effective cooling can be represented.

In a further, particularly advantageous embodiment of the invention, it is provided that the burner has an ignition device that can in particular be operated electrically and by means of which the mixture is to be ignited and consequently to be combusted in the combustion chamber. The ignition device is for example designed to provide, i.e., to generate, at least one ignition spark in the ignition chamber, in particular while using electrical energy or electrical current, whereby the mixture is to be ignited in the combustion chamber by means of the ignition spark. The ignition device is for example designed as a glow plug, spark plug or as a glow element.

To obtain a particularly efficient operation of the burner and thus to obtain a particularly advantageous mixture preparation, it has proved advantageous if the ignition device has at least one cooling ribs for cooling the ignition device protruding outwards in the radial direction of the ignition device from a base body of the ignition device and. It can in particular be provided that the ignition device has several cooling ribs for cooling the ignition device protruding outwards in the radial direction of the ignition device from a base body of the ignition device and spaced apart from one another in the longitudinal extension direction of the base body. The radial direction of the ignition device and thus of the base body runs perpendicular to the longitudinal extension direction of the base body and thus of the ignition device as a whole. A particularly large surface area can be obtained via the cooling ribs, via which heat can be removed from the ignition device in a particularly advantageous manner. To provide a particularly advantageous cooling of the ignition device, and thus a particularly efficient operation of the burner, it is provided in a further embodiment of the invention that the respective cooling rib has several through openings that can in particular be flowed through by air.

It has finally proved advantageous if the burner has at least one closing element in particular designed as a solid body, which can be moved, in particular pivoted, in particular translationally, relative to the outflow openings and for example relative to the previously specified component element between at least one closed position fluidically blocking at least one of the outflow openings and at least one open position releasing the at least one outflow opening. In other words, the closing element blocks the at least one outflow opening in the closed position, such that no particles and no gas, in particular from the combustion chamber, can penetrate into the at least one outflow opening or penetrate through the at least one outflow opening. In the open position, however, the closing element releases the at least one outflow opening, such that the air can flow through the at least one outflow opening. By means of the closing element, it can be avoided that gases such as exhaust gas from the combustion chamber and/or particles from the combustion chamber penetrate the at least one outflow opening and can thus penetrate into the swirl chamber, such that a negative impairment of the mixture preparation that can be caused by such particles or by the gas can be avoided.

In a further, particularly advantageous embodiment of the invention, it is provided that the turbulent flow of the first part of the air, in particular in the inner swirl chamber, is contrary to the turbulent flow of the second part, in particular in the outer swirl chamber. In other words, the swirl chambers are preferably designed to generate the turbulent flows of the parts of the air as turbulent flows that are contrary in relation to one another. Thus, for example, a first of the turbulent flows runs in a first rotation direction when viewed along the respective axial direction of the respective swirl chamber during a or the previously specified operation of the burner. In other words, the first turbulent flow for example has a first rotation direction when viewed in the axial direction of the respective swirl chamber. The second turbulent flow has a second rotation direction contrary to the first rotation direction when viewed in the axial direction of the respective swirl chamber. In other words, the second turbulent flow runs in a second rotation direction contrary to the first rotation direction when viewed in the axial direction of the respective swirl chamber. A particularly advantageous mixture preparation can thus be obtained, such that the components can be quickly and efficiently (i.e., using little fuel) heated and/or kept warm.

To obtain a particularly advantageous mixture preparation, and thus a particularly efficient operation of the burner, it is provided in a further embodiment of the invention that the smallest flow cross-section of the second outflow opening that can be flowed through by the second part of the air is delimited or formed entirely by the end edge inwards in the radial direction of the respective outflow opening and thus of the respective swirl chamber. In other words, the second outflow opening has its smallest flow cross-section on the end edge.

In a further, particularly advantageous embodiment of the invention, it is provided that the outer swirl chamber and thus the second outflow opening are formed by a component element in particular formed as one part, which can for example be formed separately from the previously specified component. It is in particular conceivable that the previously specified component, in particular formed as one part can be arranged in the component element. It is preferably provided that an anti-recirculation plate extends outwards from the component element in the radial direction of the respective outflow opening and thus of the respective swirl chamber, the anti-recirculation plate protruding outwards over at least a partial region of the component element in the radial direction of the respective outflow opening, and thus over the respective swirl chamber. It is conceivable that the partial region is arranged upstream of the anti-recirculation plate, i.e., on a rear side of the anti-recirculation plate, of which the rear side faces the respective swirl chamber. Thus, for example, at least a first region of the combustion chamber, in which, for example, the anti-recirculation plate is arranged, is at least partially divided from a second region of the combustion chamber by means of the anti-recirculation plate. It is in particular conceivable that the anti-recirculation plate extends completely continuously around the respective swirl chamber or around the respective outflow opening in the peripheral direction of the respective outflow opening, and thus of the respective swirl chamber, running around the respective axial direction of the respective outflow opening. By means of the anti-recirculation plate, it can be avoided, in particular after it exits the second outflow opening, that the mixture comprising the air and the fuel flows backwards into the combustion chamber, i.e., flows counter to the respective flow direction along which the parts and the fuel flow for example through the second outflow opening, such that an excessive vortex formation, in particular in the combustion chamber, can be avoided. For this purpose, it is preferably provided that the anti-recirculation plate runs in an imaginary plane that runs perpendicular to the respective flow direction and thus perpendicular to the respective axial direction of the respective outflow opening or of the respective swirl chamber. A particularly efficient operation of the burner can thus be obtained.

To prevent the mixture from flowing back into the combustion chamber excessively, and thus to avoid an excessive vortex formation in the combustion chamber, and thus to be able to obtain a particularly efficient operation of the burner, it is provided in a further embodiment of the invention that the second outflow opening ends in the flow direction of the parts of the air flowing through the second outflow opening and thus in the flow direction of the fuel flowing through the second outflow opening in a or in the previously specified imaginary plane running perpendicular to the flow direction of the parts of the air flowing through the second outflow opening. The anti-recirculation plate is thus not set back against the flow direction in relation to the second outflow opening, in particular in relation to its end, and instead, it is preferably provided that the second outflow opening, in particular its end, and the anti-recirculation plate lie in the shared imaginary plane, such that an excessive vortex formation can be safely avoided.

It has proved particularly advantageous if the anti-recirculation plate is formed as one part with the component element. An excessive vortex formation can thus be safely avoided, whereby the burner can be operated particularly efficiently in a particularly cost-efficient manner.

It has finally proved particularly advantageous if the combustion chamber has several removal openings spaced apart from one another and separated from one another by respective wall regions preferably designed as solid bodies, wherein the wall regions are preferably formed as one part with one another. For example, the wall regions are formed by a perforated plate or perforated disc. Via the removal openings, the burner exhaust gas resulting from the combustion of the mixture can be removed from the combustion chamber, and thus introduced into the exhaust gas tract.

In the following, a start of the burner is described: During a cold start of the burner, there is still no high temperature and thus no high air movement in the respective swirl chamber. Usually, this state does not permit ignition, or this state at least makes an ignition more difficult. To obtain a particularly quick and effective start of the burner even when an internal combustion engine is running and/or in cold environmental conditions, the mixture should be able to be ignited, in particular in the combustion chamber, and thus be present as a mixture that can be ignited. This can be achieved by so-called pre-storage of fuel or of the fuel. For this purpose, for example, the fuel is first fed into the inner swirl chamber by means of a fuel pump and in particular fed, in particular injected into the inner swirl chamber via the injection element, and thus pre-stored, in particular for two to six seconds, i.e., during a period of time that is or can be pre-determined, which can for example lie in a range of two to six seconds inclusive, in particular while the ignition device remains deactivated, i.e., while an ignition spark ceases to be provided by the ignition device. Only afterwards, i.e., only after the period of time runs out, is the ignition device switched on, i.e., activated, and an actual air and fuel feed is started. In other words, it is for example preferably provided that the swirl chambers cease to be provided with air during the period of time. Due to this pre-storage, a particularly rich mixture forms, which, despite large droplets, also offers a large fuel surface area suitable for ignition due to a high mass.

An advantageous cooling of the ignition device for example designed as a spark plug can for example be obtained via perforated, in particular drilled ribs, in particular made of aluminium, which can, for example, be arranged or provided on a thread of the ignition device designed in particular as an outer thread and also described as an ignition spark thread. As an alternative or in addition, an in particular off-centre air feed, i.e., an at least substantially off-centre feed of the respective part of the air into the respective swirl chamber or into at least one of the swirl chambers can be provided. The previously specified fuel pump can be frequency-controlled and/or have a piston and a spring, such that exhaust gas cannot flow back. The use of a return valve can thus be avoided, and a particularly low dead volume can be created. In particular, it is conceivable that the prefilmer or the inner swirl chamber has a venturi nozzle, on or in the narrowest flow cross-section of which, for example, the injection element is arranged. The injection element, in particular the lance, can preferably have several, and in particular more than two, particularly small exit openings. The through direction for example forms a jet angle with the axial direction of the inner combustion chamber. In other words, for example, the fuel can flow through the exit opening while forming a fuel jet, and thus flow out of the injection element via the exit opening, wherein the fuel jet, in particular its longitudinal central axis, coincides with the through direction. By correspondingly selecting or adjusting the jet angle, a particularly advantageous mixture preparation can be produced. As an alternative or in addition, an afterburner or an afterburn function is conceivable, for example to generate a particularly high power and in particular a power of the burner greater than eight kilowatts. The burner has a nominal power, for example, that can be eight kilowatts, wherein an at least briefly higher power of the burner compared to the nominal power can be represented by the afterburner function. Particularly high temperatures of the gas, for example of at least or greater than 600 degrees Celsius, can thus also be obtained, such that, for example, the components designed in particular as particle filters can be heated to a particularly high temperature, for example of at least or greater than 600 degrees Celsius.

A second aspect of the invention relates to a motor vehicle designed in particular as a motor car and most preferably as a passenger car, having at least one burner according to the first aspect of the invention.

Further advantages, features and details of the invention result from the following description of preferred exemplary embodiments and with reference to the drawings. The features and combinations of features specified previously in the description and the features and combinations of features specified in the following description of figures and/or shown in the figures alone can be used not only in the respectively specified combination, but also in other combinations or in isolation without leaving the scope of the invention.

DETAILED DESCRIPTION OF THE DRAWINGS

Figure 1:
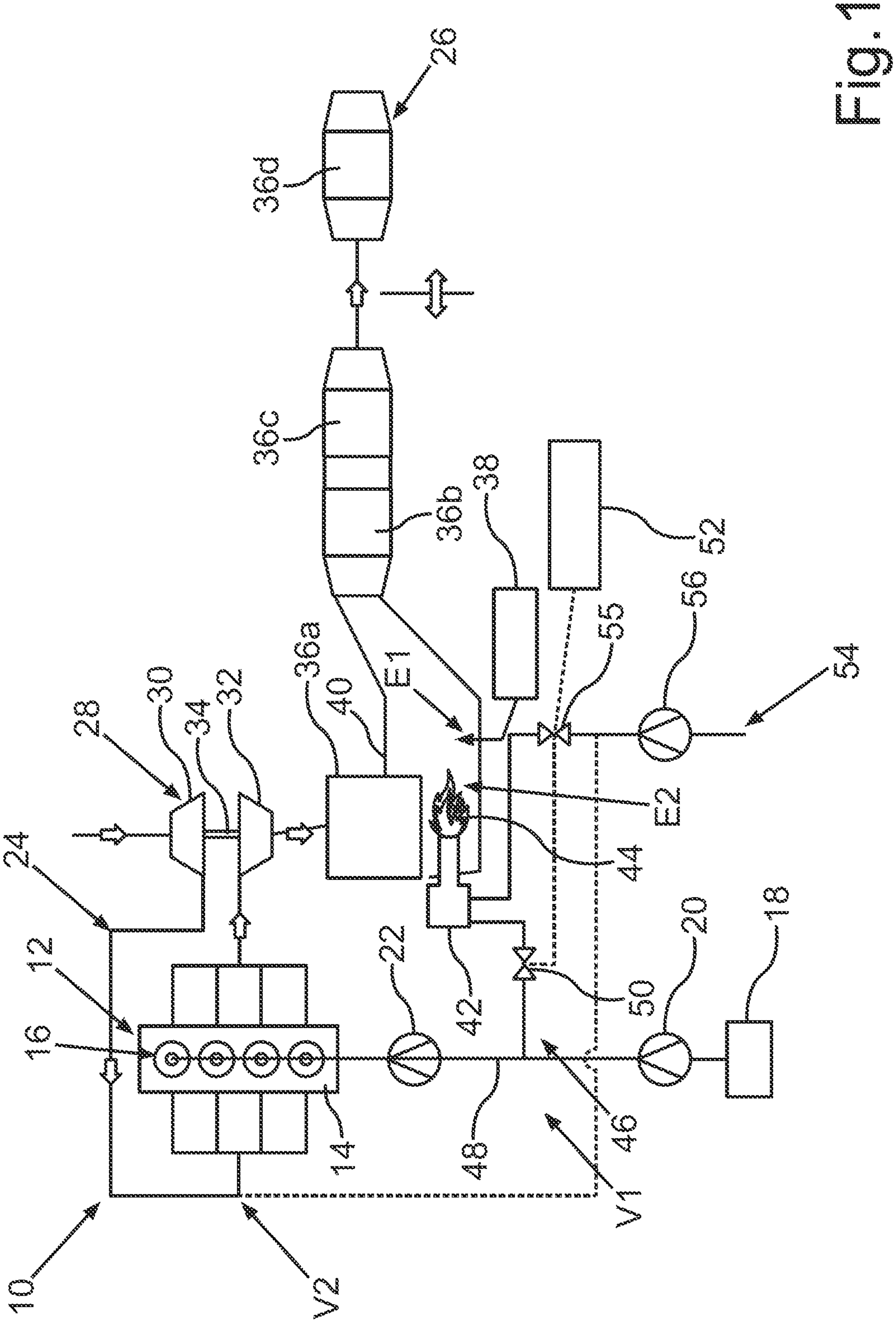
FIG. 1 shows a schematic depiction of a drive device of a motor vehicle having an internal combustion engine, an exhaust gas tract and a burner.

FIGS. 2, 5, 7 and 14 serve to explain the background of the invention.

Identical or functionally identical elements are provided with the same reference numerals in the figures.

FIG. 1 shows, in a schematic depiction, a drive device 10 of a motor vehicle preferably designed as a motor car, in particular as a passenger car. This means that the motor vehicle designed as a land vehicle has the drive device 10 in its fully produced state and can be driven by means of the drive device 10. The drive device 10 has an internal combustion engine 12 also described as an internal combustion motor, which has an engine block 14 also described as an engine housing. The internal combustion engine 12 additionally has cylinders 16, which are formed or delimited, in particular directly, by the engine block 14. During a fired operation of the internal combustion engine 12, respective combustion processes are running in the cylinders 16, from which an exhaust gas of the internal combustion engine 12 results. For this purpose, an in particular liquid fuel is introduced, in particular directly injected, into the respective cylinder 16 within a respective work cycle of the internal combustion engine 12. The internal combustion engine 12 can be designed as a diesel engine, such that the fuel is preferably a diesel fuel. A tank 18, also described as a fuel tank, is provided in which the fuel is or can be received. A respective injector is for example assigned to the respective cylinder 16, by means of which the fuel can be introduced, in particular directly injected, into the respective cylinder 16. By means of a low-pressure pump 20, the fuel is fed from the tank 18 to a high-pressure pump 22, by means of which the fuel is fed to the injectors or to a fuel distribution element shared by the injectors and also described as a rail or a common rail. The injectors can be provided with the fuel from the fuel distribution element shared by the injectors by means of the fuel distribution element, and can introduce, in particular directly inject, the fuel from the fuel distribution element into the respective cylinder 16.

The drive device 10 comprises an intake tract 24 that can be flowed through by fresh air, by means of which the fresh air flowing through the intake tract 24 is guided to and into the cylinder 16. The fresh air forms a mixture of fuel and air with the fuel, which mixture comprises the fresh air and the fuel, and is ignited and thus combusted in the respective cylinder 16 within the respective work cycle. The mixture of fuel and air is in particular ignited via self-ignition. Exhaust gas of the internal combustion engine 12, of which the exhaust gas is also described as engine exhaust gas, results from the ignition and combustion of the mixture of fuel and air.

The drive device 10 has an exhaust gas tract 26 that can be flowed through by the exhaust gas from the cylinders 16. The drive device 10 additionally comprises an exhaust gas turbocharger 28 that has a compressor 30 arranged in the intake tract 24 and a turbine 32 arranged in the exhaust gas tract 26. The exhaust gas can flow out of the cylinders 16, flow into the exhaust gas tract 26 and then flow through the exhaust gas tract 26. The turbine 32 can be driven by the exhaust gas flowing through the exhaust gas tract 26. The compressor 30 can be driven by the turbine 32, in particular via a shaft 34 of the exhaust gas turbocharger 28. By driving the compressor 30, the fresh air flowing through the intake tract 24 is compressed by means of the compressor 30. Several components 36*a-d* are arranged in the exhaust gas tract 26, the components being designed as respective exhaust gas aftertreatment devices, i.e., exhaust gas aftertreatment components for aftertreating the exhaust gas. The components 36*a-d* are arranged following one after the other in the flow direction of the exhaust gas of the internal combustion engine 12 flowing through the exhaust gas tract 26, and are thus connected to one another in series or serially. For example, the component 36*a* is an oxidation catalyst, in particular a diesel oxidation catalyst (DOC). Furthermore, the component 36 can be a nitrogen oxide storage catalyst (NSK). The component 36*b* can be an SCR catalyst, which is also simply described as an SCR. The component 36*c* can be a particle filter, in particular a diesel particle filter (DPF). The component 36*d* can for example have a second SCR catalyst and/or an ammonia slip catalyst (ASC).

The motor vehicle has a structure for example designed as a self-supporting body that forms or delimits an interior of the motor vehicle also described as a passenger cell or safety cell. During a respective journey of the motor vehicle, people can be located in the interior. For example, the structure forms or delimits an engine compartment in which the internal combustion engine 12 is arranged. The exhaust gas turbocharger 28 is for example arranged in the engine compartment. The structure additionally has a base, also described as a main base, via which the interior is at least partially, in particular at least substantially or completely delimited downwards in the vertical direction of the vehicle. For example, the components 36*a, b, c* are arranged in the engine compartment, such that for example the components 36*a, b* and *c* form a so-called hot end or are components of a so-called hot end. The hot end can in particular be directly flange-mounted on the turbine 32. The component 36*d* is for example arranged outside of the engine compartment and underneath the base in the vertical direction of the vehicle, such that for example the component 36*d* forms a so-called cold end or is a component of the so-called cold end.

The drive device 10 comprises a dosing device 38, by means of which an in particular liquid reducing agent can be introduced into the exhaust gas tract 26 at an introduction point E1 and can for example be introduced into the exhaust gas flowing through the exhaust gas tract 26. The reducing agent is preferably an aqueous urea solution that can provide ammonia, which can react with nitrogen oxides potentially contained in the exhaust gas to form water and nitrogen in a selective catalytic reduction. The selective catalytic reduction can be catalytically caused and/or supported by the SCR catalyst. It can be seen from FIG. 1 that the introduction point E1 is arranged upstream of the component 36*b* and downstream of the component 36*a* in the flow direction of the exhaust gas flowing through the exhaust gas tract 26. The exhaust gas tract 26 preferably has a mixing chamber 40 in which the reducing agent introduced into the exhaust gas at the introduction point E1 can be advantageously mixed with the exhaust gas.

The drive device 10 and thus the motor vehicle additionally comprise a burner 42 by means of which—as is explained in more detail in the following—at least one of the components 36*b, c, d* arranged downstream of the burner 42 in the flow direction of the exhaust gas flowing through the exhaust gas tract 26 can be quickly and efficiently heated and/or kept warm. The burner 42 can combust a mixture, in particular while forming a flame 44, and in particular while providing a burner exhaust gas, wherein the burner exhaust gas or the flame 44 is or can be introduced into the exhaust gas tract 26 at an introduction point E2. This means that the burner 42 is arranged so to speak on the introduction point E2. In the exemplary embodiment described in FIG. 1, the introduction point E2 is arranged upstream of the components 36*b, c* and *d* and downstream of the component 36*a*. In other words, in the exemplary embodiment shown in FIG. 1, the burner 42 is arranged upstream of the components 36*b, c, d* and downstream of the component 36*a*. As an alternative, it is conceivable that the burner 42 or the introduction point E2 is arranged upstream of the component 36*a* and in particular downstream of the turbine 32. The previously specified mixture to be combusted in the burner 42 or by means of the burner 42 comprises air and a liquid fuel. In the exemplary embodiment shown in FIG. 1, the propellant used as the combustible fuel and/or at least a partial quantity of the air which is added to the burner 42 and is used to form the mixture, can for example originate from the intake tract 24. For this purpose, a fuel supply path 46 is provided, which is or can be fluidically connected to the burner 42 on the one hand and on the other hand to a fuel conduit 48. The fuel conduit 48 can be flowed through by the fuel flowing from the tank 18 to the injectors or to the fuel distribution element. The fuel supply path 46 is fluidically connected to the fuel conduit 48 at a first connection point V1, wherein the connection point V1 is arranged downstream of the low-pressure pump 20 and upstream of the high-pressure pump 22 in the flow direction of the fuel flowing from the tank 18 to the fuel distribution element or to the respective injector. At least a part of the liquid fuel flowing through the fuel conduit 48 can be removed from the fuel conduit 48 at the connection point V1 and introduced into the fuel supply path 46. The fuel introduced into the fuel supply path 46 can flow through the fuel supply path 46 and is guided to and in particular into the burner 42 as the fuel by means of the fuel supply path 46. A first valve element 50 is arranged in the fuel supply path 46, by means of which a quantity of the fuel flowing through the fuel supply path 46 and thus to be added to the burner 42 can be adjusted. An electronic computer 52 also described as a control device is provided, by means of which the valve element 50 can be controlled, such that the quantity of the fuel flowing through the fuel supply path 46 and to be added to the burner 42 can be adjusted, in particular is to be regulated, by means of the control device via the valve element 50.

An air supply path 54 is further provided, via which or by means of which the burner can be or is provided with the air to form the mixture. This means that the air supply path 54 can be flowed through by the air from which the mixture is formed. A pump 56 also described as an air pump is arranged in the air supply path 54, by means of which pump the air can be fed through the air supply path 54 and can thus be fed to the burner 42. For example, the low-pressure pump 20 also described as a low-pressure fuel pump is described as a fuel pump, by means of which the fuel is fed through the fuel supply path 46 and thus to the burner 42.

It can be seen that the air supply path 54 is fluidically connected to the intake tract 24 at a second connection point V2. Thus, for example, at least a part of the fresh air flowing through the intake tract 24 can be removed from the intake tract 24 at the connection point V2 and introduced into the air supply path 54. The fresh air introduced into the air supply path 54 can flow through the air supply path 54 as the air, and is guided to and in particular into the burner 42 by means of the air supply path 54. A second valve element 55 is arranged in the air supply path 54, by means of which second valve element the quantity of the air that is used to form the mixture and flows through the supply path 54 and thus flows through the burner 42 can be adjusted. For example, the control device is designed to control the valve element 55, such that for example the quantity of the air that is used to form the mixture and flows through the air supply path 54 and thus to be added to the burner 42 can be adjusted, in particular is to be controlled, by means of the control device via the valve element 55.

Figure 2:
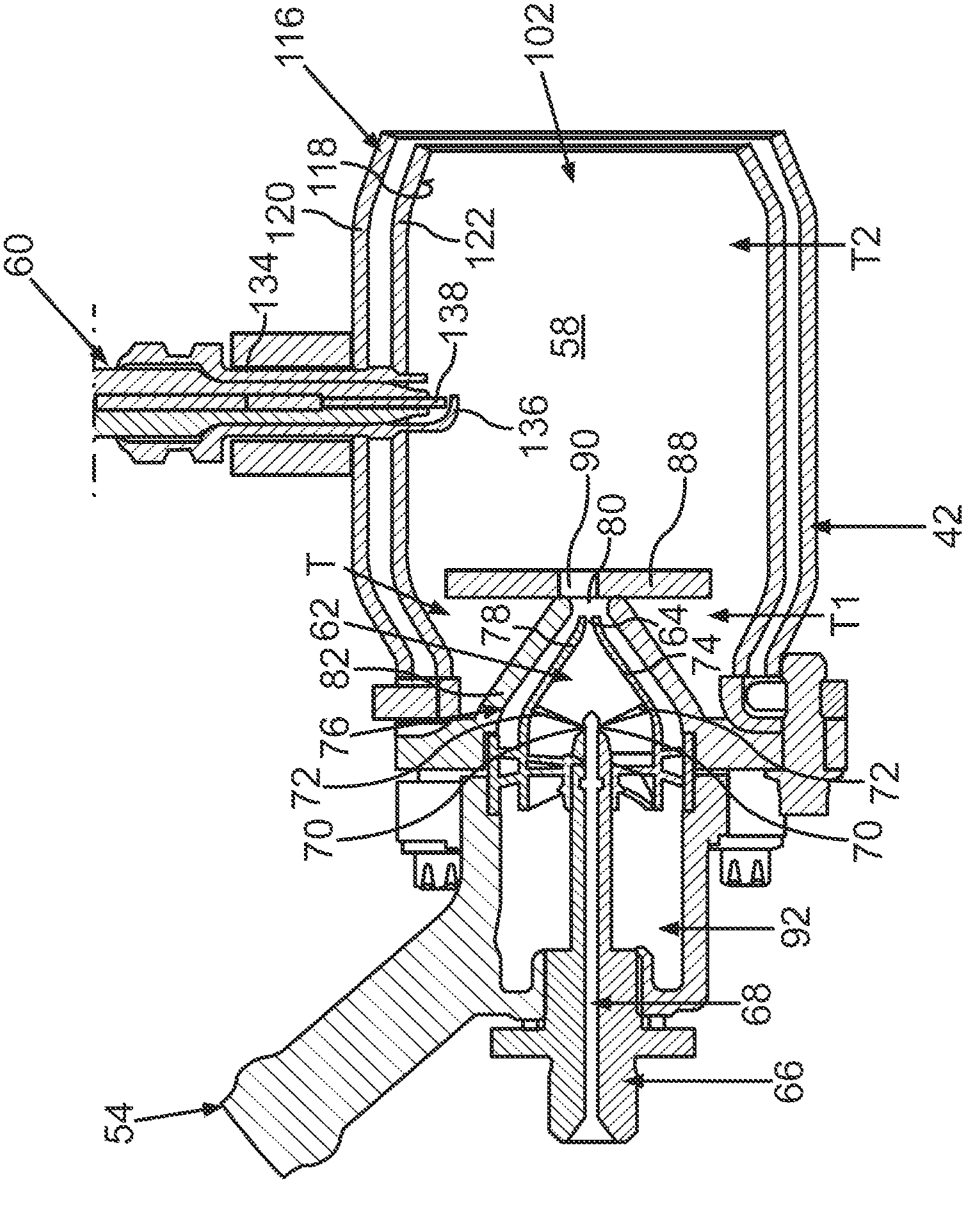
FIG. 2 shows a schematic longitudinal sectional view of a first embodiment of the burner.

FIG. 2 shows a first embodiment of the burner 42 in a schematic sectional view. The burner 42 has a combustion chamber 58 in which the air added to the burner 42 and the mixture added to the burner 42 and comprising liquid fuel is to be ignited and thus combusted, i.e., it to be ignited and thus combusted during an operation of the burner 42. For this purpose, an ignition device 60 designed for example as a spark plug or glow plug or glow element is provided, by means of which ignition device at least one ignition spark can be generated in the combustion chamber 58, in particular using electrical energy or electrical current. By means of the ignition spark, the mixture in the combustion chamber 58 is ignited and combusted, in particular while providing the burner exhaust gas and/or while providing the flame 44. By means of the burner exhaust gas or by means of the flame 44, the exhaust gas flowing through the exhaust gas tract 26 can for example be quickly and efficiently heated and/or kept warm, such that, for example, at least the component 36*b* can be quickly and efficiently heated and/or kept warm by means of the exhaust gas that has been heated and/or kept warm and that flows through the components 36*b*, *c* and *d*.

The burner 42 has an inner swirl chamber 62 that can be flowed through by a first part of the air that is added to the burner 42, and causes a turbulent first flow of the first part of the air. This should in particular be understood to mean that the first part of the air flows turbulently through at least one first partial region of the swirl chamber 62 and/or flows turbulently out of the swirl chamber 62 and/or flows turbulently into the combustion chamber 58. The inner swirl chamber 62 has in particular exactly one first outflow opening 64 that can be flowed through by the first part of the air along a first through direction of the outflow opening 64 and thus along a first flow direction coinciding with the first through direction. The first part of the air can be removed from the inner swirl chamber 62 via the first outflow opening 64. This means that the first part of the air can flow out of the inner swirl chamber 62 via the first outflow opening 64. The burner 42 further comprises an introduction element in the form of an injection element 66, which has a conduit 68 that can be flowed through by the liquid fuel that is added to the burner 42.

In the first embodiment, the injection element 66 is designed as a lance that is also described as a fuel lance. The conduit 68, and thus the injection element 66, has at least one exit opening 70 that can be flowed through by the liquid fuel flowing through the conduit 68. It can be seen from FIG. 2 that in the first embodiment, the conduit 68, and thus the injection element 66 has at least or exactly two exit openings 70, for example designed as holes. The exit opening 70 can be flowed through by the fuel along a respective second through direction, such that the fuel flowing through the injection element 66 can be injected out of or can exit from the injection element 66 via the respective exit opening 70 and can be injected, and thus introduced, into the inner swirl chamber 62, in particular directly. In other words, the injection element 66 or the conduit 68 leads into the inner swirl chamber 62 via the respective exit opening 70, such that the liquid fuel can be injected into the inner swirl chamber 62, in particular directly, via the respective exit opening 70 by means of the injection element 66. The respective second through direction of the respective exit opening 70 coincides with a respective second flow direction along which the fuel can flow through the respective exit opening 70. It can be recognized that the fuel can be injected out of the injection element 66 via the respective exit opening 70 while forming a respective fuel jet 72, and can thus be injected, in particular directly, into the inner swirl chamber 62. For example, the respective fuel jet 72, of which the longitudinal central axis coincides for example with the respective second through direction or with the respective second flow direction, is designed at least substantially conically. In addition, for example, the injection element 66, and thus presently the conduit 68, has a longitudinal direction or longitudinal extension or longitudinal extension direction that runs in parallel with the first through direction, and thus in parallel with the first flow direction, in particular with the first through direction, and thus coincides with the first flow direction. It can further be seen from FIG. 2 that the first through direction, and thus the first flow direction coincide with the axial direction of the outflow opening 64 and with the axial direction of the inner swirl chamber 62. The respective second through direction or the respective second flow direction runs perpendicularly or presently obliquely to the first through direction, and thus to the first flow direction and to the axial direction of the swirl chamber 62 and the outflow opening 64.

The swirl chamber 62 is at least partially, in particular at least substantially and thus more than half or even completely formed or delimited by a preferably single-part component 74 preferably of the burner 42, such that the component 74 also forms or delimits the outflow opening 64.

The burner 42 further has an outer swirl chamber 76 that surrounds at least one longitudinal region and presently also the first outflow opening 64 in the peripheral direction of the swirl chamber 62, in particular completely continuously running around the axial direction of the swirl chamber 62. The component 74 has a dividing wall 78 that is arranged between the swirl chambers 62 and 76 in the radial direction of the swirl chamber 62 and the radial direction of which runs perpendicular to the axial direction of the swirl chamber 62. The swirl chambers 62 and 76 are thus separated from each other in the radial direction of the swirl chamber 65 by the dividing wall 78. The axial direction of the swirl chamber 62 coincides with the axial direction of the swirl chamber 76, such that the radial direction of the swirl chamber 62 coincides with the radial direction of the swirl chamber 76. The outer swirl chamber 76 can be flowed through by a second part of the air, which is added to the burner 42, and is designed to cause a turbulent second flow of the second part of the air. This means that the second part of the air flows turbulently through the swirl chamber 76 and/or flows turbulently out of the swirl chamber 76 and/or flows turbulently into the combustion chamber 58. In particular, it is preferably provided that the parts of the air have their turbulent flows in the combustion chamber 58, and thus run turbulently in the combustion chamber 58. The outer swirl chamber 76 has, in particular exactly, one second outflow opening 80 that can be flowed through, in particular along a third flow direction, by the second part of the air flowing through the outer swirl chamber 76, the third through direction of which second outflow opening, along which the outflow opening 80 can be flowed through by the second part of the air flowing through the swirl chamber 76, presently coincides with the axial direction of the swirl chamber 76, and thus with the axial direction of the swirl chamber 62. The third through direction coincides with a third flow direction, along which the second part of the air flowing through the outer swirl chamber 76 flows through or can flow through the outflow opening 80. This means in particular that the first through direction coincides with the third through direction and the first through direction coincides with the third flow direction, such that the first flow direction, the third flow direction, the first through direction and the third through direction presently coincide with the axial direction of the swirl chamber 62 and with the axial direction of the swirl chamber 76. The second outflow opening 80 is arranged downstream of the outflow opening 64 in the flow direction of the parts of the air, and in particular in series or serially with the outflow opening 64, such that the outflow opening 80 can be flowed through by the second part of the air, by the first part of the air and by the fuel. In particular, the first part of the air is in particular mixed with the fuel due to the turbulent first flow already in the swirl chamber 62, in particular while forming a partial mixture. The partial mixture can flow through the outflow opening 64 and thus flow out of the swirl chamber 62, and then flow through the outflow opening 80, and is mixed with the second part of the air, in particular due to the advantageous turbulent second flow, whereby the mixture is particularly advantageously prepared, and thus the partial mixture is particularly advantageously mixed with the second part.

It can be seen that the swirl chamber 76 is at least partially, in particular at least substantially and thus at least more than half or even completely, delimited inwardly in the radial direction of the respective swirl chamber 62 or 76 by the component 74, in particular by the dividing wall 78. The swirl chamber 76 is at least partially, in particular at least substantially or completely, delimited by a component element 82, which is presently designed separately from the component 74, outwards in the radial direction of the respective swirl chamber 62 or 76. The component 74 is at least partially, in particular at least substantially, arranged in the component element 82. The outflow opening 80 is for example partially delimited or formed by the component element 82 and partially by the component 74, in particular with regard to the lowest or smallest flow cross-section of the outflow opening 80 that can be flowed through by the second part.

Figure 3:
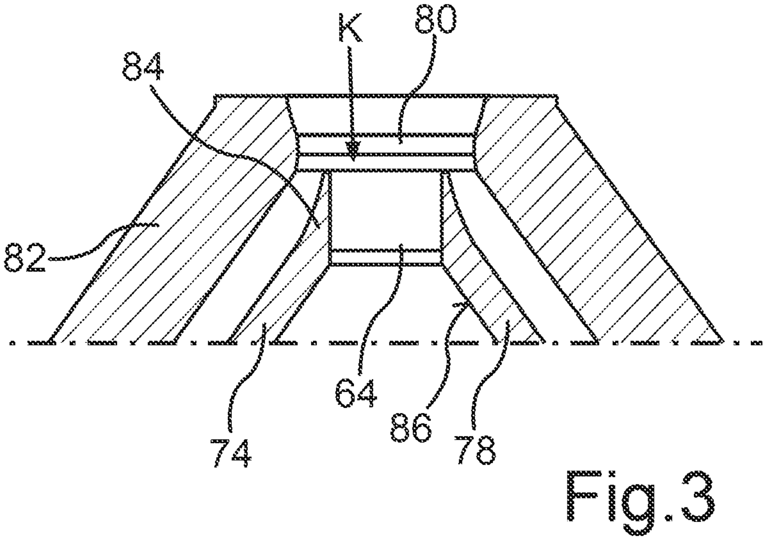
FIG. 3 shows a section of a schematic longitudinal sectional view of the burner according to the first embodiment.

In order for at least the component 36*b* to be able to be heated and/or kept warm particularly efficiently, it is provided that—as can be seen particularly clearly from FIG. 3—the first outflow opening 64 ends in the flow direction of the first part of the air flowing through the first outflow opening 64 and thus in the flow direction of the fuel flowing through the first outflow opening 64 on an end edge K that has been machined in a targeted, in particular mechanical, manner and is thus knife-sharp, the edge for example running completely around the outflow opening 64 in the peripheral direction of the outflow opening 64 running around the axial direction of the outflow opening 64, the axial direction of which coincides with the respective swirl chamber 62 or 76. The knife-sharp end edge K is formed by an atomizing lip 84, which is presently formed by the component 74. The atomizing lip 84 tapers in the flow direction of the first part of the air flowing through the first outflow opening 64, and thus in the flow direction of the fuel flowing through the first outflow opening 64, towards the end edge K, and ends on the end edge K. For example, the end edge K is sanded and/or lathed, and thus mechanically machined in a targeted manner. For example, the fuel is sprayed against the component 74 in particular while forming the fuel jets 72, in particular against a lateral surface 86 of the component 74 on the internal periphery, in particular such that a fuel film also simply described as a film is formed from the fuel on the component 74, in particular on the lateral surface 86 on the internal periphery. It can in particular be seen that the inner swirl chamber 62 is formed, in particular directly, by the lateral surface 86 on the internal periphery outwards in the radial direction of the inner swirl chamber 62. The fuel film is transported by the first turbulent flow, in particular by centrifugal forces resulting from the first turbulent flow, along the lateral surface 86 on the internal periphery to the end edge K, at which the fuel breaks away from the end edge K, whereby particularly tiny droplets of the fuel result from the fuel or from the fuel film. The component 74 is thus a so-called prefilmer or functions as a film layer between the turbulent flows. The droplets in combination form a particularly large surface area of the fuel, such that a particularly efficient operation of the burner can be obtained even at low outputs of the burner, whereby no high-cost pumps or no high-cost high-pressure generation are required to generate the small and thus fine droplets of the fuel. The smallest flow cross-section of the second outflow opening 80 that can be flowed through by the second partial fan is completely delimited or formed inwards by the end edge K in the radial direction of the respective outflow opening 64 or 80.

The burner 42 further has an anti-recirculation plate 88, which, in the first embodiment, is arranged downstream of the outflow opening 80 and downstream of the component element 82 in the flow direction of the parts flowing through the outflow opening 80 and of the fuel flowing through the outflow opening 80. The anti-recirculation plate 88 has a through opening 90, which is correspondingly arranged downstream of the outflow opening 80 and thus can be flowed through by the parts of the air and by the fuel from the swirl chambers 62 and 76. Starting from the through opening 90, and in particular starting from the outflow opening 80 and starting from the component element 82, in particular starting from its end, the anti-recirculation plate 88 extends outwards in the axial direction of the respective swirl chamber 62 or 76, whereby the anti-recirculation plate 88 protrudes outwards beyond at least a partial region T of the component element 82 in the radial direction of the respective swirl chamber 62 or 76. Thus, for example, a first part T1 of the combustion chamber 58 is at least partially separated from the second part T2 of the combustion chamber 58 by means of the anti-recirculation plate 88. By means of the anti-recirculation plate 88, an excessive flow of the mixture flowing through the through opening 90 and into the combustion chamber 58, in particular into the part T2 back in the direction of the component element 82 or back into the part T1 can be avoided, such that an advantageous mixture preparation can be achieved.

It can further be seen from FIG. 2 that for example the swirl chambers 62 and 76 are supplied with the air or the parts of the air via a supply chamber 92 shared by the swirl chambers 62 and 76. The supply chamber 92 is arranged upstream of the swirl chambers 62 and 76 in the flow direction of the parts flowing through the swirl chambers 62 and 76. This means that the air is first introduced into the supply chamber 92 via the air supply path 54. The air that has been introduced into the supply chamber 92 can flow through the supply chamber 92 on its way to and into the swirl chambers 62 and 76 and is divided into the first part and the second part, in particular by means of the component 74. The air flowing through the air supply path 54 can for example flow out of the air supply path 54 along a supply direction and flow into the supply chamber 92, wherein the supply direction for example runs obliquely and/or tangentially to the axial direction of the respective swirl chamber 62 and 76, and thus to their respective longitudinal axis.

Figure 4:
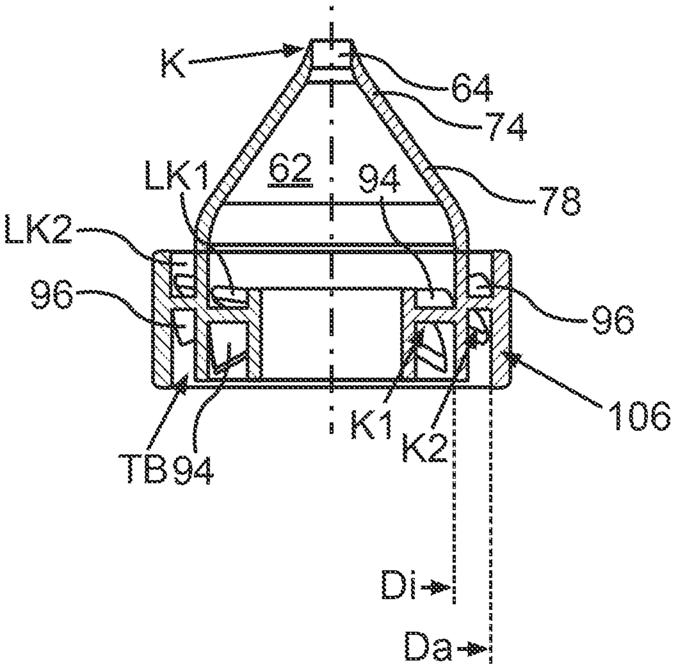
FIG. 4 shows a schematic longitudinal sectional view of a component of the burner according to the first embodiment.

FIG. 4 shows the component 74 also described as a prefilmer in a schematic longitudinal sectional view. It can be seen that at least a part TB of the outer swirl chamber 76 is formed by the component 74. The component 74 has first swirl generators 94 of the inner swirl chamber 62 and second swirl generators 96 of the outer swirl chamber 76. By means of the swirl generators 94, the first turbulent flow of the first part of the air is generated, and by means of the swirl generators 96, the second turbulent flow of the second part of the air is generated. An inner annular surface, in particular the inner swirl chamber 62, is labelled K1 in FIG. 4, and an outer annular surface, in particular the outer swirl chamber 76, is labelled K2 in FIG. 4. The swirl generators 94 are arranged in an air conduit LK1 of the swirl chamber 62, of which the air conduit LK1 is delimited, in particular completely, by the component 74. The air conduit LK1 is in particular delimited outwards and inwards in the radial direction of the respective swirl chamber 62 or 76 by the component 74. The swirl generators 96 are arranged in a second air conduit LK2 of the swirl chamber 76, of which the air conduit LK2 is delimited completely and in particular outwards and inwards in the axial direction of the respective swirl chamber 62 or 76 by the component 74. For example, the swirl generators 94 and 96 are also formed by the component 74. The air conduit LK1 can be flowed through by the first part of the air and the air conduit LK2 can be flowed through by the second part of the air, such that the swirl generators 94 generate or cause the first turbulent flow and the swirl generators 96 generate or cause the second turbulent flow. An outer diameter of the air conduit LK1 also described as an air guide is labelled with Di, and an outer diameter of the air conduit LK2 also described as an air guide is labelled with Da in FIG. 4.

As can be seen from FIGS. 2 to 4, the outflow openings 64 and 80 also described as nozzles are both aligned in the axial direction. This means that the partial mixture flows at least substantially in the axial direction out of the inner swirl chamber 62 into the combustion chamber 58. Furthermore, the second part of the air also flows at least substantially in the axial direction out of the outer swirl chamber 76 into the combustion chamber 58 and on the end edge K, in particular on its break-away point, entrains the finely distributed fuel from the prefilmer in small droplets into the combustion chamber 58. The smallest or narrowest flow cross-section of the outer nozzle, and thus of the outflow opening 80, is on the break-away point of the inner nozzle, and thus the outflow opening 64, i.e., the end edge K.

It is preferably provided that the nozzles, and thus the outflow openings 64 and 80, have the following sizes or surface ratios: The outflow opening 64 (inner nozzle) preferably has a diameter, in particular an inner diameter, which has 10 percent to 20 percent of Di. It is also preferably provided that the outer nozzle, and thus the outflow opening 80, has a diameter, in particular an inner diameter that is for example 10 percent to 35 percent of Da. An annular surface area should be coextensive from the inside to the outside, and thus both the inside and the outside should be 50 percent of the entire annular surface area. In other words, it is preferably provided that the air conduit LK1 has a first annular surface area and the air conduit LK2 has a second annular surface area, wherein the annular surface areas are preferably the same size.

Figure 5:
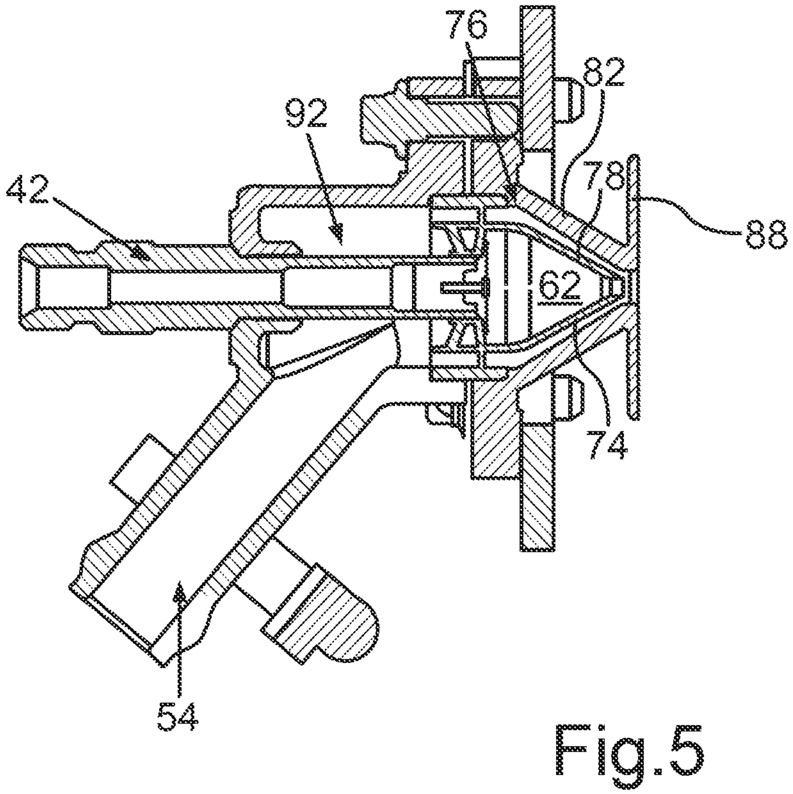
FIG. 5 shows a schematic longitudinal sectional view of a second embodiment of the burner.

FIG. 5 shows a second embodiment of the burner 42 in a schematic sectional view. In the first embodiment, it is provided for example that the component element 82 and the anti-recirculation plate 88 are designed as components that are designed separately from one another and are at least indirectly, in particular directly, connected to each other. In the second embodiment, it is provided that the anti-recirculation plate 88 is designed as one part with the component element 82. In the second embodiment too, it can advantageously be avoided by means of the anti-recirculation plate 88 that the mixture cannot flow backwards back to the component element 82 after exiting from the outer nozzle, and thus from the outflow opening 80 and into the combustion chamber 58 and form a vortex. The anti-recirculation plate 88 also simply described as a plate preferably has a diameter, in particular an outer diameter, that is preferably at least as large as Di.

Figure 6:
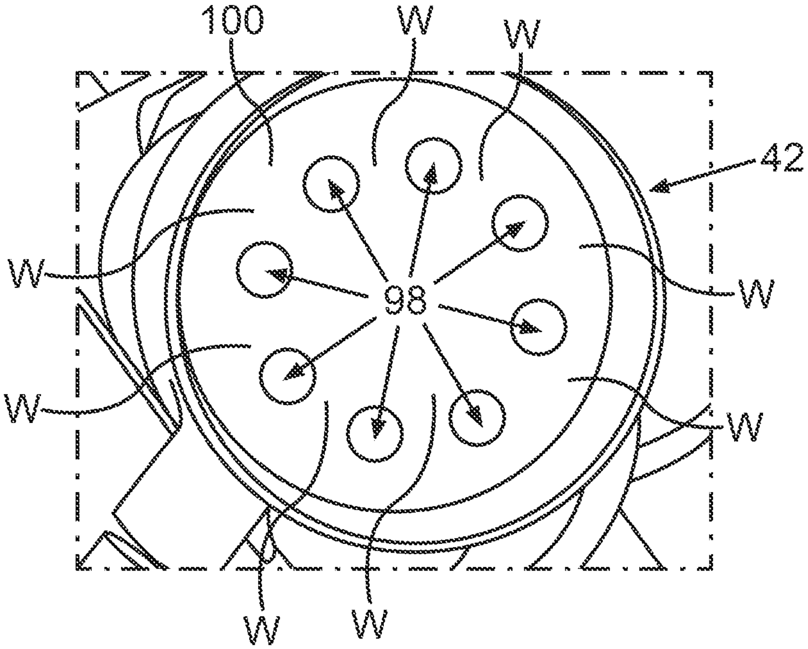
FIG. 6 shows a section of a schematic and perspectival rear view of a third embodiment of the burner.

FIG. 6 shows a section of a third embodiment of the burner 42 in a perspective view. In the third embodiment, the combustion chamber 58 has several through openings 98 that are spaced apart from one another and are separated from one another by respective wall regions W in particular designed as solid bodies, in particular in the radial direction of the respective swirl chamber 62 or 76. Via the through openings 98, the burner exhaust gas or the flame 44 can be removed from the combustion chamber 58 and introduced into the exhaust gas tract 26. The wall regions W are presently designed as one part with one another and formed for example by a perforated disc 100 formed as one part that is designed as a solid body. Precisely eight through openings 98 are preferably provided. As can be seen from FIG. 2, it is conceivable in principle that the combustion chamber 58 has exactly one large and non-subdivided removal opening 102, via which the burner exhaust gas or the flame 44 can be removed from the combustion chamber 58 and introduced into the exhaust gas tract 26. Contrastingly, in the third embodiment, the several through openings 98 are spaced apart from one another and separated from one another, such that the removal opening 102 is effectively subdivided or divided into the several through openings 98 by the wall regions W. It can be seen that the through openings 98 are equally distributed in the peripheral direction running around the axial direction of the respective swirl chamber 62 or 76 and are in particular arranged along a circle, of which the mid-point is arranged in the respective axial direction of the respective swirl chamber 62 or 76. Thus, in the third embodiment, instead of a large exit opening in the form of the large removal opening 102, several exit openings in the form of the through openings 98 are provided, in particular at a respective particular point, to enable an advantageous recirculation in the combustion chamber 58. Instead of a smaller exit opening, it is advantageous to use a perforated plate, e.g., the perforated disc 100 having several smaller openings in the form of the through opening 98. The number of through openings 98 is in a range of three to nine inclusive. The through openings 98 have a similar or at least substantially identical flow surface or exit surface that can be flowed through by the burner exhaust gas or by the flame 44. In total, the through surfaces of the or of all of the through openings 98 results in a total through surface that is described as a total exit surface, and for example, is 0.8 to 1.8 times as large as a single, centrally arranged opening, e.g., the removal opening 102. For example, instead of a central exit opening having a diameter of 25 millimetres, and thus having a surface area of 491 square millimetres, it can be advantageous, depending on flow conditions in the exhaust gas tract 26, to implement six smaller openings having a respective diameter of 10.5 millimetres, such that an entire exit surface of 520 square millimetres is represented.

Figure 7:
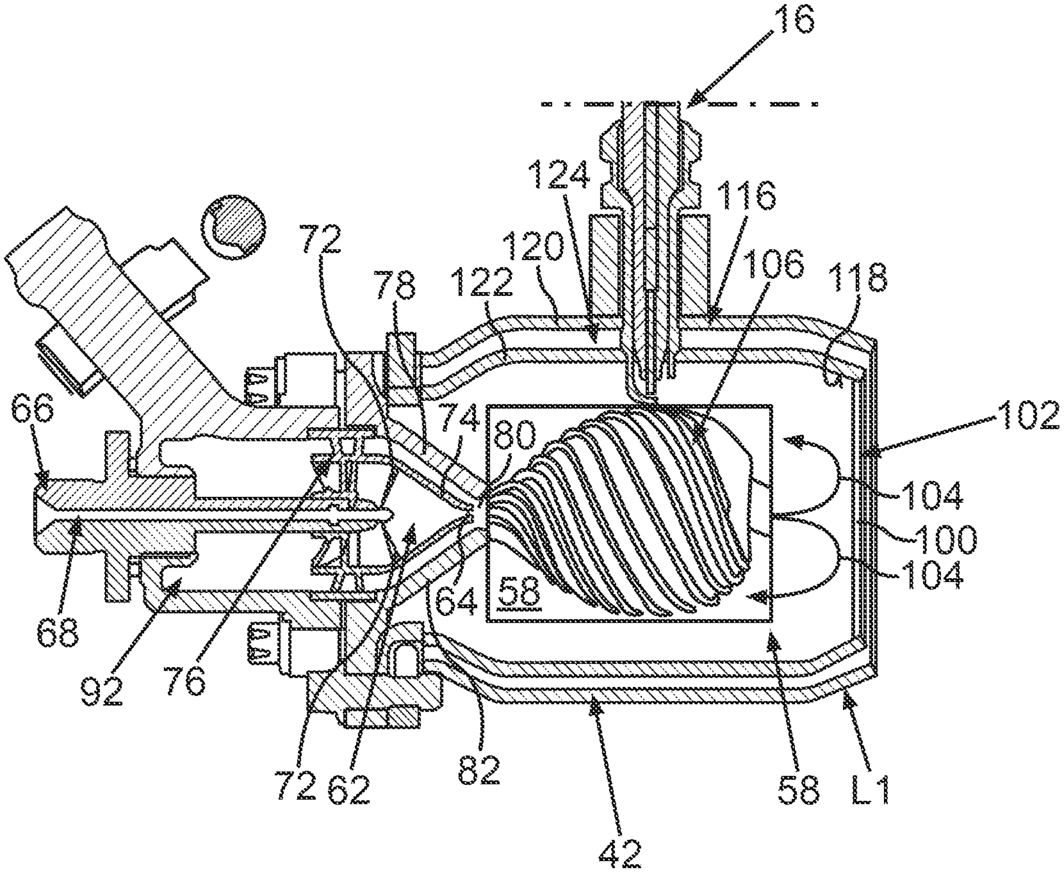
FIG. 7 shows a schematic longitudinal sectional view of the burner according to the third embodiment.

FIG. 7 shows the third exemplary embodiment of the burner 42 in a schematic longitudinal sectional view, wherein the perforated disc 100 also described as a perforated plate is provided. The previously specified advantageous recirculation in the combustion chamber 58 is depicted by an arrow 104 in FIG. 7. In addition, a turbulent flow of the mixture is depicted in FIG. 7 and is labelled with 106, wherein the turbulent flow 106 of the mixture in the combustion chamber 58 results from the respective turbulent flows of the parts of the air. The turbulent flows of the parts of the air, and thus the turbulent flow 106 of the mixture is in particular implemented via the swirl generators 94 and 96 and by the tangential air feed, in particular via the air supply path 54. The respective swirl generator 94 or 96 is preferably designed as an air guide vane, and not as a quarter-spherical sheet-metal construction, such that the respective turbulent flow can be particularly advantageously generated or caused. The turbulent flows of the parts of the air and, resulting from the latter, the turbulent flow 106 of the mixture in the combustion chamber 58 prevents the flame 44 from being blown out in the combustion chamber 58, optimizes a mixing of the air with the fuel in the combustion chamber 58, and generates vortex bursting for stabilizing the flame 44. The recirculation in the combustion chamber 58 depicted by the arrows 104 can in particular be implemented by using the perforated plate and, resulting from the latter, a reduction in an exit cross-section, via which the flame 44 or the burner exhaust gas can be removed from the combustion chamber 58 and can be introduced into the exhaust gas tract 26. Reducing the exit cross-section should be understood to mean that, for example, the entire exit surface of the individual through openings 98 is smaller than a surface area of the large continuous removal openings 102. An improved mixing of the air and the fuel in the combustion chamber 58 and a longer dwell time of the burning mixture in the combustion chamber 58 results from the advantageous recirculation in the combustion chamber 58 depicted by the arrows 104, such that when the flame 44 or burner exhaust gas exits from the combustion chamber 58, an excessive emission of non-combusted hydrocarbons (HC) can be avoided in the exhaust gas tract 26, and a particularly high temperature of the flame 44 or of the burner exhaust gas can be implemented on its exit.

The recirculation leads in particular to recirculation areas and vortex bursting, whereby a particularly long dwell time of the flame 44 can be implemented in the combustion chamber 58.

Figure 8:
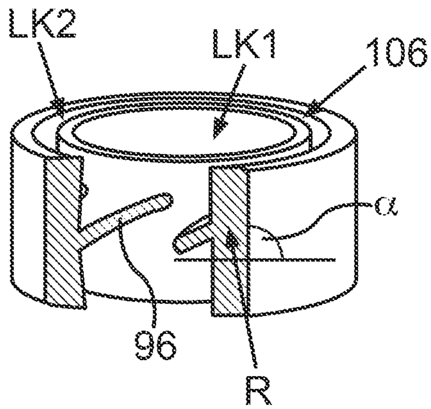
FIG. 8 shows a section of a schematic and partially sectional perspectival view of a swirl generation apparatus of the burner.
Figure 9:
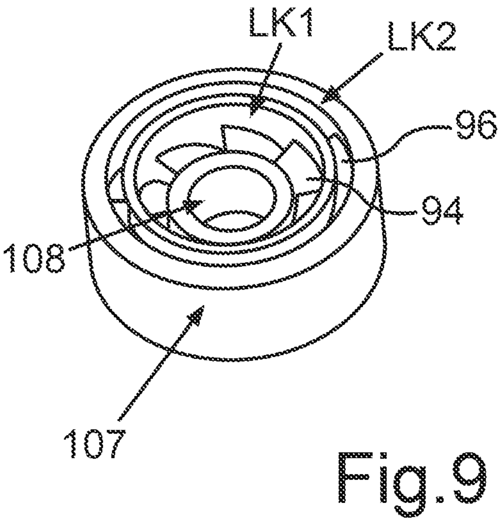
FIG. 9 shows a schematic perspectival view of the swirl generation apparatus.

FIG. 8 shows a swirl generation apparatus 107 in a schematic and partially sectional perspective view, which can for example be a component part of the component 74 or be formed by the component 74. The swirl generation apparatus 107 comprises the swirl generators 94 of the inner swirl chamber 62 and the swirl generators 96 of the outer swirl chamber 76. It can be particularly clearly seen from FIG. 8 that the swirl generators 96 and preferably also the swirl generators 94 are designed as air guide vanes, which can be designed, in particular formed, in a manner favourable to flow. An excessive loss of pressure can thus be avoided, in particular in comparison with spherical swirl generators. The number of swirl generators 94 is for example in a range of six to eleven inclusive. As an alternative or in addition, the number of outer swirl generators 96 is for example in a range of eight to 14 inclusive. The respective air conduit LK1 or LK2, in which the swirl generators 94 or 96 are arranged, has a respective surface area per se, for example, which is covered for example from at least 20 percent to at most 70 percent by the respective swirl generator arranged in the air conduit LK1 or LK2. A particularly advantageous axial obstruction of at least 20 percent and at most 70 percent of the respective surface area is thus provided. A respective radius of the respective air guide vane can extend from at least 40 percent of Di up to an unlimited extent, such that the respective air guide vane can be straight in shape. It is in particular conceivable that the respective air guide vane makes a respective angle $\alpha$ with the respective radial direction of the respective swirl chamber 62 and 76, the angle for example lying in a range of 10 degrees to 45 degrees inclusive. The previously specified radius of the respective air guide vane, also simply described as a vane, is labelled with R in FIG. 8. The swirl generators 94 or 96 are preferably designed to divert the part of the air flowing through the respective air conduit LK1 or LK2, and thus the air flowing through the respective air conduit LK1 or LK2 and forming the respective part, by 70 degrees to 90 degrees, in particular in relation to the strictly or purely axial direction of the respective swirl chamber 62 or 76. To implement a particularly advantageous mixture preparation, the air guide vanes of the inner and outer swirl chambers 62 and 76 can be designed contrary to one another. In other words, it is conceivable that the outer swirl generator 96 of the outer swirl chamber 76 and the inner swirl generator 94 of the inner swirl chamber 62 are designed to form or to cause the turbulent flows of the parts of the air as contrary or opposite turbulent flows, such that, for example, the first flow is counter-clockwise and the second flow is clockwise or vice versa.

The swirl generation apparatus 107 has an in particular central through opening 108, which is passed through by the injection element 66. In other words, the injection element 66 protrudes through the through opening 108 into the inner swirl chamber 62.

Figure 10:
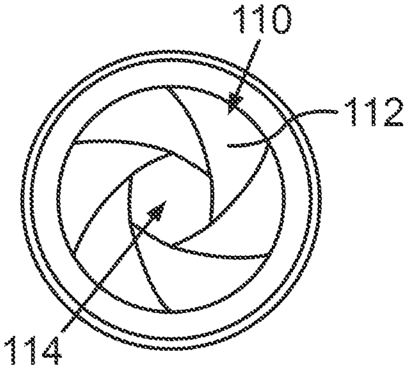
FIG. 10 shows a schematic front view of a closing device.

FIG. 10 shows a closing device 110 in a schematic front view that is presently designed as an iris diaphragm or in the manner of an iris diaphragm. If the burner 42 is not operated, it can be advantageous to block an air conduit and a fuel conduit, i.e., for example the air supply path 54 and/or the fuel supply path 46 and/or the swirl chambers 62 and 76, and for example the outflow opening 64 and/or the outflow opening 80 to avoid exhaust gas of the internal combustion engine 12 entering the air supply path 54, the fuel supply path 46, the supply chamber 92, the swirl chamber 62 and/or the swirl chamber 76. It is further conceivable to block the combustion chamber 58 or at least one longitudinal region of the combustion chamber 58 to avoid exhaust gas of the internal combustion engine 12 entering the combustion chamber 58 or its partial region or longitudinal region from the exhaust gas tract 26. For this purpose, the closing device 110 can be used, the closing device for example being able to be arranged in the combustion chamber 58 or downstream of the combustion chamber 58. Closing elements 112 of the closing device 110, the closing elements being able to be moved in the manner of an iris diaphragm, can vary, i.e., variably adjust an opening cross-section 114 that can be flowed through by the flame 44 or by the burner exhaust gas and is delimited, in particular directly, by the closing elements 112, whereby for example the opening cross-section 114 can be adjusted, in particular controlled or regulated depending on load. It is thus conceivable to close at least a partial region of the combustion chamber 58 by means of the closing device 110. As an alternative or in addition, the outflow opening 80 can for example be closed by means of a first closing device 110. As an alternative or in addition, the outflow opening 80 can for example be closed by means of a second closing device 110. This in particular has the advantage that an air and fuel supply can be simultaneously blocked by means of a small stopper. No air valve downstream of the pump 56 is needed either, as it prevents an entry of exhaust gas into the pump 56. A much larger exhaust gas flap that is exposed to hot exhaust gas after the combustion chamber 58 or after its exit is also not required.

It is in particular conceivable that the opening cross-section 114 is an opening cross-section or exit cross-section, in particular of the combustion chamber 58, wherein the flame 44 or the burner exhaust gas can be removed from the combustion chamber 58 and introduced into the exhaust gas tract 26 via the exit cross-section. A tapering of the opening cross-section that is necessary, required or carried out to increase a flow velocity of the flame 44 or of the burner exhaust gas from the combustion chamber 58, in particular by corresponding movement of the closing elements 112 being implemented in the manner of an iris diaphragm should be represented in a manner favourable to flow. Thus, a conical outlet having an angle of 30 degrees to 70 degrees to the horizontal could be implemented instead of a hole in a flat closing plate, as is implemented, for example, by segments and/or by a cone in an aircraft engine. This can be implemented by a fixed geometry or variably, as in an aircraft engine having individual segments, the segments being foldable, for example in a thrust nozzle, or having a shiftably arranged exit cone that can for example be shifted in the axial direction of the respective swirl chamber 62 or 76.

Figure 11:
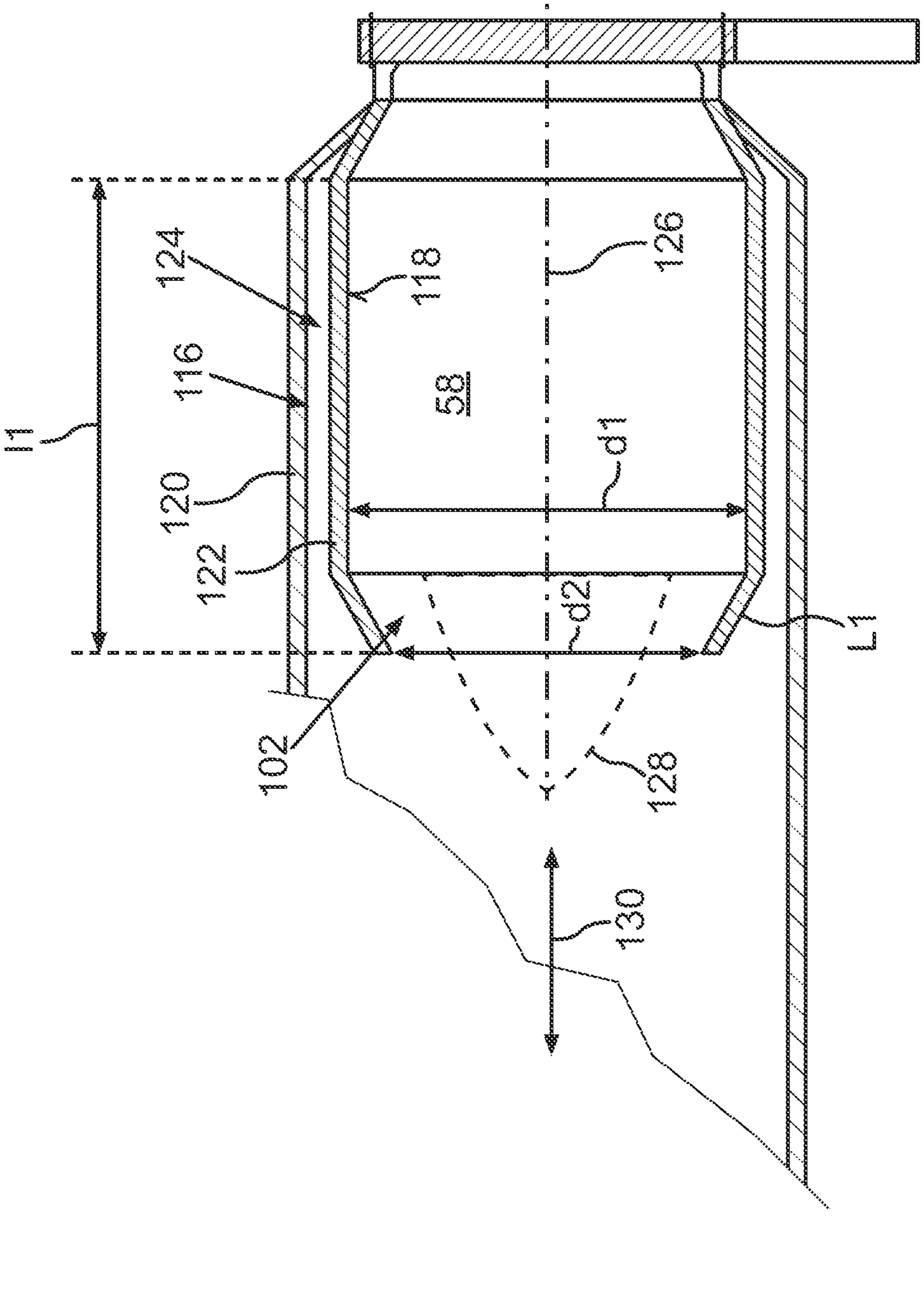
FIG. 11 shows a section of a schematic longitudinal sectional view of a fourth embodiment of the burner.

FIG. 11 shows a section of the burner 42 according to a fourth embodiment in a schematic sectional view. It can be seen particularly clearly from FIG. 11, but also from FIGS. 2 and 7, that the combustion chamber 58 is formed or delimited by a chamber element 116 in particular designed as a solid body. In particular, the combustion chamber 58, of which the axial direction coincides with the axial direction of the respective swirl chamber 62 or 76, is delimited, in particular directly, along its radial direction running in parallel with the respective radial direction of the respective swirl chamber 62 or 76 by a lateral surface 118 of the chamber element 116 on the internal periphery. The chamber element 116 can be designed as one-part. In the fourth embodiment, the chamber element 116 is designed such that it has two chamber parts 120 and 122 that are for example designed as one part with one another, or the chamber parts 120 and 122 are component parts that are designed separately from one another and connected to one another. The lateral surface 118 on the internal periphery is formed by the chamber part 122. The chamber parts 120 and 122 are arranged within one another, such that at least one longitudinal region of the chamber part 120 surrounds at least one longitudinal region of the chamber part 122 in the peripheral direction of the combustion chamber 58 running around the axial direction of the combustion chamber 58, in particular completely continuously, wherein at least the longitudinal region of the chamber part 120 is spaced apart from the longitudinal region of the chamber part 122 outwards in the radial direction of the combustion chamber 58, in particular while forming a clearance 124. The clearance 124 is arranged in the radial direction of the combustion chamber 58 between the chamber parts 120 and 122, and is for example designed as an air gap, in particular between the chamber parts 120 and 122. It can further be seen that the removal opening 102 that is continuous per se or uninterrupted, is formed or delimited by the chamber part 122 in particular completely continuously in the peripheral direction of the combustion chamber 58. In the first embodiment shown in FIG. 2, the removal opening 102 is not subdivided, i.e., is free of a component subdividing the removal opening 102 into several through openings separated from one another and spaced apart from one another. In the third embodiment shown in FIG. 7, however, the perforated disc 100, also described as a perforated plate, is arranged in the removal opening 102, by means of which disc the removal opening 102 that is uninterrupted per se, i.e., continuous, is subdivided or divided into the several through openings 98 spaced apart from one another and separated from one another that are formed in the perforated disc 100. The flame 44 or the burner exhaust gas can flow out of the combustion chamber 58 along a fourth flow direction running in the axial direction of the combustion chamber 58, i.e., running in parallel with the axial direction of the combustion chamber 58 or coinciding with the axial direction of the combustion chamber 58, and can flow through the removal opening 102 or through the respective through opening 98, wherein the fourth flow direction coincides with the first, second and third flow direction. It can be seen that the removal opening 102 tapers in the flow direction of the burner exhaust gas flowing through the removal opening 102, i.e., along the fourth flow direction. For this purpose, the chamber element 116, in particular the chamber part 120, has a longitudinal region L1 tapering in the flow direction of the burner exhaust gas flowing through the removal opening 102, the longitudinal region delimiting the removal opening 102 in the peripheral direction of the combustion chamber 58, in particular completely continuously. In other words, the longitudinal region L1, and thus the removal opening 102, are conical, i.e., cone-shaped or truncated cone-shaped in the flow direction of the burner exhaust gas flowing through the removal opening 102. As the burner exhaust gas or the flame 44 flows out of the combustion chamber 58 via the removal opening 102, the removal opening 102 is formed on an exit of the combustion chamber 58 or forms an exit of the combustion chamber 58, wherein in the fourth embodiment, the combustion chamber 58 is conical in shape at its exit, and thus has a cone formed by the longitudinal region L1. The removal opening 102 preferably has an internal diameter of 34 mm. In other words, it is preferably provided that the smallest or narrowest internal diameter of the removal opening 102 that can be flowed through by the burner exhaust gas is 43 mm.

As at least the longitudinal regions of the chamber parts 120 and 122 are arranged within one another, and are spaced apart from one another in the radial direction of the combustion chamber 58 while forming the clearance 124, wherein the clearance 124 is for example filled with air and thus designed as an air gap, a double wall of the combustion chamber 58 or of the chamber element 116 is created, whereby the combustion chamber 58 is insulated by the clearance 124, i.e., by the air gap. The combustion chamber 58 is thus insulated by air gap. In the following, reference is made in particular to the outer diameter Da shown in FIG. 4 of the prefilmer, in particular of the outer air conduit LK2 of the outer swirl chamber 76, wherein the air conduit LK2 in which the outer swirl generators 96 are arranged, and thus the outer diameter Da, are formed, in particular completely, by the prefilmer, i.e., by the component 74. With reference to FIG. 11 and the outer diameter Da, the combustion chamber 58 preferably has an inner diameter d1 that is preferably 1.0 times to 3.0 times Da, in particular upstream of the cone or upstream of the longitudinal region L1. It is further preferably provided that the smallest inner diameter d2 of the removal opening 102, wherein the smallest inner diameter d2 of the removal opening 102 is also described as an exit diameter, is 0.7 times to 2.3 times Da. A smaller exit diameter of the removal opening 102 maintains the exit velocity of the burner exhaust gas and reduces the influence of the flame 44, also described as a burner flame, by the exhaust gas, also described as engine exhaust gas, of the internal combustion engine 12. A length l1 of the combustion chamber 58 running in the axial direction of the combustion chamber 58 is preferably 1.5 to 4.0 times Da, in particular without secondary air injection. It is preferably provided with secondary air injection that the length l1 of the combustion chamber is 2.0 to 5.5 times Da.

Instead of the continuous removal opening 102, it is conceivable to use the several through openings 98 separated from one another and spaced apart from one another. In other words, it is conceivable that the removal opening 102 that is continuous per se and thus uninterrupted is divided into the several through openings 98 that are spaced apart from one another and separated from one another, the number of the through openings preferably lying in a range of 3 to 9 inclusive. The respective through opening 98 has a surface area, also described as an exit surface or through surface, wherein the sum of the surface areas of all of the through openings 98 is preferably the same as the exit surface of the continuous removal openings 102, i.e., the same as the surface area of the removal opening 102. The sum of the surface areas of the through openings 98 is also described as a total exit surface. The through openings 98 are for example designed as holes. It is conceivable that the sum of the surface areas of all of the through openings 98, i.e., the total exit surface, is 0.8 times to 1.8 times the surface area of the or of an uninterrupted, continuous removal opening of the removal opening 102 of the combustion chamber 58. It is in particular conceivable that the perforated disc 100 is arranged in the removal opening 102 or in the longitudinal region L1. With regard to the exhaust gas also described as engine exhaust gas, it can be advantageous for the internal combustion engine 12 to use a deflection element, in particular a deflection element and/or a perforated element, in particular a perforated sheet, wherein the perforated element can in particular be understood to mean an element formed as a solid body that has several holes spaced apart from one another and in particular separated from one another via respective walls, the holes being able to be flowed through by a gas, e.g., the burner exhaust gas or the engine exhaust gas. So that the engine exhaust gas does not excessively negatively influence and destabilize the flame 44 in the combustion chamber 58, for example, it is advantageous to provide a deflection element, e.g., a deflection sheet, in front of the combustion chamber 58, i.e., upstream of the combustion chamber 58, so that the engine exhaust gas cannot or can only slightly enter the combustion chamber 58, in particular against the flow direction, along which the flame 44 or the burner exhaust gas flows out of the combustion chamber 58 into the exhaust gas tract 26. It is thus preferably provided that the deflection element is arranged upstream of the combustion chamber 58, i.e., upstream of the introduction point E2, in the exhaust gas tract 26 in the flow direction of the engine exhaust gas. A geometry of the deflection element can depend on how the combustion chamber 58 is arranged in relation to the exhaust gas tract 26, i.e., in relation to an exhaust gas conduit of the exhaust gas tract 26. The exhaust gas conduit should be understood to mean that the burner exhaust gas or the flame 44 flows out of the combustion chamber 58, in particular along the fourth flow direction, into the exhaust gas conduit, in particular at the introduction point E2. An individual adjustment of the geometry of the deflection element is advantageous.

It is further advantageous, as previously described, that the closing device 110 or another closing device is arranged on the exit of the combustion chamber 58. This should in particular be understood to mean the following: The closing device 110 can for example be arranged in the longitudinal region L1 or in the removal opening 102, such that a flow cross-section, which can be flowed through by the burner exhaust gas or by the flame 44 and via which the burner exhaust gas or the flame 44 can be removed from the combustion chamber 58, in particular at the introduction point E2, and can be introduced into the exhaust gas tract 26, in particular into the exhaust gas conduit, is delimited by the closing device 110, in particular by the closing elements 112, and can consequently be varied, i.e., can be adjusted, by means of the closing device 110. The adjustable flow cross-section is in particular the opening cross-section 114.

The closing device 110 can be arranged in the chamber part 122 and in the removal opening 102, or the closing device 110 or another closing device is arranged downstream of the combustion chamber 58, i.e., downstream of the chamber part 122 and directly connected to the combustion chamber 58 or to the chamber part 122, and is thus arranged downstream of the removal opening 102 per se. A tapering of the removal opening 102, as is implemented in the fourth embodiment by the longitudinal region L1, i.e., by the cone described, leads to an increase of the flow velocity of the burner exhaust gas, wherein the tapering of the exit of the combustion chamber 58 should be depicted in a manner favourable to flow. The cone presently formed by the longitudinal region L1 preferably has an angle, also described as a cone angle, in particular to the axial direction of the combustion chamber 58, in particular depicted in FIG. 11 by a dashed line 126, of 30° to 70°. In the fourth embodiment, the cone is formed as a fixed geometry, such that the cone, i.e., the cone angle is fixed, i.e., is not variable. It is conceivable, however, to form the cone variably, e.g., as in an aircraft engine, in particular with regard to its cone angle, in particular via individual segments, which can for example be folded, i.e., can in particular be pivoted relative to the chamber part 122 as in a thrust nozzle in an aircraft engine, whereby the cone or the cone angle can be adjusted, i.e., can be varied. As an alternative or in addition, it can be provided that the cone or its cone angle can be varied by a shiftably arranged exit cone and/or that an exit cone is provided of which the longitudinal central axis coincides for example with the axial direction of the combustion chamber 58 and/or can be shifted in the axial direction of the combustion chamber 58, in particular relative to the chamber element 116, wherein the exit cone, which is preferably arranged coaxially with the combustion chamber 58, tapers in the flow direction of the burner exhaust gas flowing through the removal opening 102. The feature that the exit cone is arranged coaxially with the combustion chamber 58 should in particular be understood to mean that the axial direction of the exit cone, and thus of its longitudinal central axis, coincides with the axial direction of the combustion chamber 58. By shifting the exit cone in the axial direction of the combustion chamber 58 relative to the chamber element 116, the flow cross-section that can be flowed through by the burner exhaust gas and via which the burner exhaust gas can be removed from the combustion chamber 58 and can be introduced into the exhaust gas conduit can for example be varied. The exit cone is shown particularly schematically and is labelled with 128 in FIG. 11. A movement direction running in parallel with the axial direction of the combustion chamber 58 or coinciding with the axial direction of the combustion chamber 58 and along which the exit cone 128 can be moved, in particular shifted, translationally relative to the chamber element 116 is depicted in FIG. 11 by a double arrow 130. It can be recognized that in the radial direction of the combustion chamber 58, the flow cross-section that can be flowed through by the burner exhaust gas is delimited outwards by the chamber element 116 and is delimited inwards by the exit cone 128, in particular respectively directly, with the flow cross-section being annular or annular-surface shaped. As the exit cone 128 tapers in the flow direction of the burner exhaust gas flowing through the removal opening 102 or the flow cross-section, the flow cross-section is varied by shifting the exit cone 128 implemented along the movement direction and relative to the chamber element 116.

Figure 12:
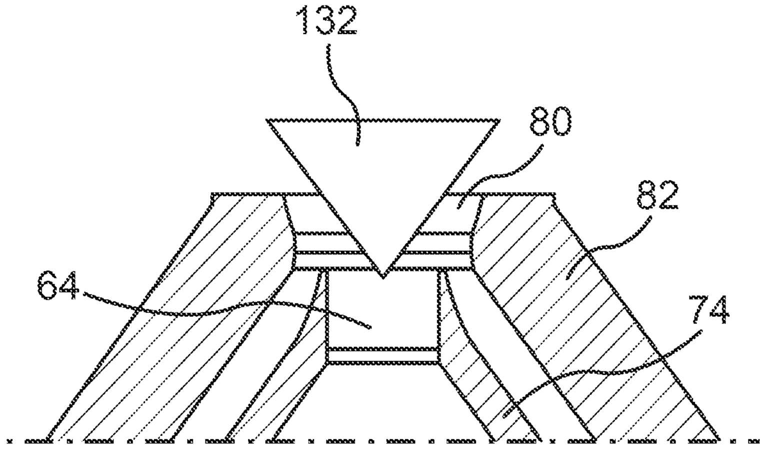
FIG. 12 shows a section of a schematic sectional view of a fifth embodiment of the burner.

FIG. 12 shows a section of a fifth embodiment of the burner 42 in a schematic sectional view. The component 74 and the component element 82 can in particular be partially seen in FIG. 12, in particular as in FIG. 3. If the burner 42 is not operated, it is advantageous to close an air and fuel conduit, i.e., preferably the outflow openings 64 and 68, to prevent the engine exhaust gas from penetrating the swirl chambers 62 and 76. For this purpose it is conceivable that for example a closing device 110 is respectively arranged in the outflow opening 64 and/or in the outflow opening 80, or the closing device 110 is arranged downstream of the outflow opening 80 and directly connected to the outflow opening 80, such that for example a first flow cross-section that can be flowed through by the first part of the air and the fuel, in particular of the outflow opening 64, and/or a second flow cross-section that can be flowed through by the parts of the air and by the fuel, in particular of the outflow opening 80, or a third flow cross-section that can be flowed through by the parts of the air and by the fuel and is arranged downstream of the outflow opening 80 and immediately or directly connected to the outflow opening 80 is variable or can be adjusted by means of the closing device 110. The first, second or third flow cross-section is for example the opening cross-section 114, i.e., in particular the opening cross-section 114 of an opening having the opening cross-section 114, of which the flow cross-section (opening cross-section 114) and thus the surface area can in particular be adjusted in the manner of an iris diaphragm by means of the closing elements 112. The respective first, second or third flow cross-section can be adjusted, in particular controlled or regulated, in particular depending on load. For example, it is conceivable to only close the two outflow openings 64 and 80, also described as exit nozzles, by means of the closing device 110 or by means of another, further closing device, and thus to reduce the first, second or third flow cross-section to zero.

The further closing device can for example be a closing element depicted particularly schematically in FIG. 12 and labelled with 132, which is also described as a closing stopper. The closing element 132 can for example be moved, in particular in the axial direction of the respective swirl chamber 62 or 76, relative to the component element 82 and relative to the component 74, in particular translationally, in particular between at least one closed position and at least one open position shown in FIG. 12. In the closed position, the outflow openings 64 and 80 are closed by the closing element 132 and thus fluidically blocked, in particular while the burner 42 is deactivated. No engine exhaust gas can thus flow through the outflow openings 64 and 80 out of the exhaust gas tract 26. In the open position, the closing element 132 releases the outflow openings 64 and 80, in particular while the burner 42 is operated. It can be seen that the outflow openings 64 and 80 can be or are simultaneously closed by means of the closing element 132 for example designed as a small stopper, in particular in the closed position of the closing element 132. No air valve, such as the valve element 55, is required downstream of the pump 56, as it can be avoided by means of the closing element 132 that engine exhaust gas flows out of the exhaust gas tract 26 through the air supply path 54. In other words, it can be avoided by means of the closing element 132 or by means of the closing device 110 that engine exhaust gas from the exhaust gas tract 26 penetrates the pump 56. A much larger exhaust gas flap to which hot exhaust gas is applied is also not required downstream of the combustion chamber 58, i.e., after its exit.

In the following, the previously specified air gap insulation of the combustion chamber 58 is explained in more detail: As the combustion chamber 58 becomes very hot on its outer wall and optionally glows, especially in its full power operation, the air gap insulation can guarantee a particularly safe operation. Heat loss can additionally be kept particularly low by the air gap insulation. It is preferably provided that an in particular thermal insulation surrounds the combustion chamber 58 in the peripheral direction running around the axial direction of the combustion chamber 58, in particular completely continuously. The air gap insulation, and thus the air gap, is provided as this insulation in the present case. The clearance 124 presently designed as an air gap preferably has a width, in particular a gap width, running in the radial direction of the combustion chamber 58, wherein the width, in particular the gap width, is preferably 6% to 25% of Da. It is in particular conceivable that the width lies in a range of 1.5 mm to 6 mm inclusive. It can in particular be seen that the chamber element 116 is a double-walled and thus air gap-insulated pipe. In other words, the chamber parts 120 and 122 form a double-walled and thus air gap-insulated pipe. It is preferably provided that an insulating element formed separately from the chamber element 116 (air gap-insulated pipe) surrounds the air gap-insulated pipe (chamber element 116), i.e., at least one longitudinal region of the chamber element 116 running in the axial direction of the combustion chamber 58, in the peripheral direction of the combustion chamber 58, in particular completely continuously. The insulation element is preferably an insulation mat. The insulation element is preferably formed at least from mineral wool and/or sheet metal, whereby the combustion chamber 58 can be particularly advantageously insulated.

In the following, a possible installation position of the combustion chamber 58 or of the burner 42 is described. As has previously been described, the mixture in the combustion chamber 58 is too thin to combust while releasing heat or heat energy. By means of the heat energy, at least the component 36*b* can for example be effectively and efficiently heated and/or kept warm. As an alternative or in addition, the component 36*c* for example designed as a particle filter can be heated. By heating the particle filter, a regeneration of the particle filter can for example be caused or carried out. So that the heat energy of the burner 42 can now be advantageously used, the latter or the introduction point E2 should be arranged as close as possible to the component to be heated or kept warm, such as for example the component 36*b* and/or 36*c*. Heat losses can thus also be kept low. To guarantee an advantageous mixing of the engine exhaust gas with the burner exhaust gas, however, a minimum distance to the mixing of the burner exhaust gas with the engine exhaust gas should be provided, wherein this minimum distance extends in particular in the flow direction of the engine exhaust gas flowing through the exhaust gas tract 26 from the burner 42 or from the introduction point E2, in particular continuously, to the component to be heated or to be kept warm, e.g., the component 36*b*, in particular to its entrance. In particular, the minimum distance is a minimum distance of the mixing chamber 40. The introduction point E2 thus cannot advance directly to the entrance of the component 36*b*. It has proved particularly advantageous if a spacing running in particular in the flow direction of the exhaust gas flowing through the exhaust gas tract 26 between the introduction point E2 and the component 36*b* immediately following the introduction point E2 in the flow direction of the exhaust gas tract 26 is at least 5 to 8 times Da and at most 30 times Da. The feature that the component 36*b* is immediately or directly connected to the introduction point E2 in the flow direction of the exhaust gas (engine exhaust gas) flowing through the exhaust gas tract 26 should be understood to mean that no other, further exhaust gas aftertreatment component is arranged in the flow direction of the exhaust gas flowing through the exhaust gas tract 26 between the introduction point E2 and the component 36*b*. As an alternative or in addition, a diameter, in particular an inner diameter, of the exhaust gas conduit in which the introduction point E2 is arranged should broaden conically to at least 6 times Da, in particular after it exits the combustion chamber 58, in particular before the exhaust gas enters the component 36*b*. In particular if the component 36*b* is a catalyst, in particular the previously specified SCR catalyst, the component 36*b* has a substrate. It is thus preferably provided that the previously specified spacing is a spacing running in particular in the flow direction of the exhaust gas flowing through the exhaust gas tract 26 between the introduction point E2 and the substrate of the catalyst. It is thus advantageous if the inner diameter of the exhaust gas conduit broadens to at least 6 times Da after exiting the combustion chamber 58, i.e., for example starting from the introduction point E2, before the exhaust gas (engine exhaust gas or burner exhaust gas) is applied to the substrate.

It can be seen from FIG. 2 that the ignition device 60 for example designed as a spark plug, glow plug or glow element has a thread 134 in particular designed as an outer thread, by means of which the ignition device 60 is at least in directly screwed to the chamber element 116 and is thus held on the chamber element 116. To obtain a sufficient cooling of the ignition device 60, i.e., an advantageous heat removal from the ignition device 60, it is advantageous if cooling ribs are applied on the thread 134 of the ignition device 60 also described as a spark plug thread. The number of cooling ribs preferably lies in a range of 1 to 7 inclusive. For example, the cooling ribs have a thickness that lies in a range of 2 to 4 mm inclusive. It is further conceivable that the respective cooling rib has a diameter, in particular an outer diameter, of 20 to 80 mm. It is additionally advantageous if the individual cooling ribs have openings, in particular through openings, designed in particular as holes to achieve advantageous heat removal in an environment of the ignition device 60, i.e., ambient air, the number of which openings lies in a range of 3 to 8 inclusive. The respective through opening of the respective cooling rib for example has a diameter, in particular an inner diameter, that is at least 5 mm and at most 15 mm. An electrode spacing between electrodes of the ignition device 60 is at least 0.7 mm and at most 10 mm. The electrodes can be seen from FIG. 2 and are labelled 136 and 138, wherein the ignition spark for igniting the mixture in the combustion chamber 58 is generated by means of the electrodes 136 and 138, in particular between the electrodes 136 and 138.

To support the causation or generation of the turbulent flows of the parts of the air in the swirl chambers 62 and 76, the air should not be introduced strictly radially, i.e., in the radial direction of the respective swirl chambers 62 or 76 into the respective swirl chamber 62 or 76, but tangentially or obliquely to the respective axial direction of the respective swirl chamber 62 or 76, as is depicted in FIG. 2. In other words, it is advantageous if the air or the respective part of the air flows into the respective swirl chamber 62 or 76 tangentially. A surge of the entering air can thus additionally be directed in the swirl direction, which results in the swirl generation being particularly highly effective.

To supply the burner 42 with the fuel, a fuel pump, e.g., a propellant pump, is used to feed the fuel from the tank 18. The fuel pump can thus for example be the low-pressure pump 20. It is advantageous to operate the burner 42 in a lambda-controlled manner, such that for example the mixture has a fuel-air ratio (γ) of substantially at least 1.0. In other words, it is preferably provided that the burner is operated stoichiometrically, and the mixture is thus a stoichiometric mixture. In other words again, it is advantageously provided if a first portion of the air in the mixture and a second portion of the fuel in the mixture can be adjusted or regulated particularly precisely. It is advantageous if the first quantity of the air, also described as combustion air, of the mixture and a second quantity of the fuel of the mixture are at least substantially precisely adjusted and/or calculated and are introduced into the respective, corresponding swirl chamber 62 or 76. It is thus advantageous to use a frequency-controlled piston pump as the fuel pump for feeding the fuel to or into the burner 42. The frequency-controlled piston pump should be provided with a spring-loaded valve, e.g., a ball valve, on its exit, to prevent fuel or exhaust gas from flowing back, in particular into the fuel pump.

Figure 17:
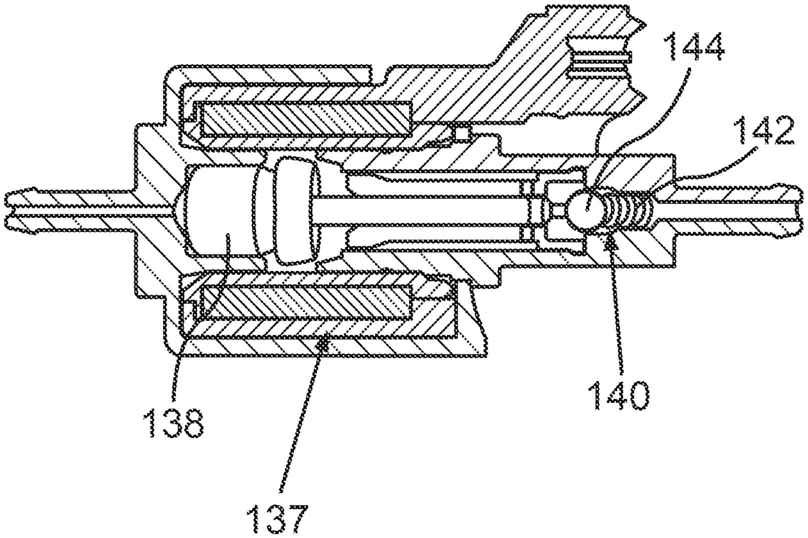
FIG. 17 shows a schematic sectional view of a fuel pump for feeding a fuel to the burner.

Such a fuel pump is shown in FIG. 17 in a schematic longitudinal sectional view and is labelled 137. The fuel pump 137 is designed as a piston pump, of which the piston for feeding the fuel is labelled 138. The spring-loaded valve, which is designed as a spring-loaded ball valve in the exemplary embodiment shown in FIG. 17, is labelled 140 in FIG. 17 and comprises an in particular mechanical spring unit 142 and a ball 144. The spring-loaded valve 140 is in particular designed as a return valve or functions as a return valve, such that the fuel can be fed to the burner 42 by means of the fuel pump 137, such that the valve 140 opens in the direction of the burner, but blocks it in the opposite direction, such that no exhaust gas and no air can flow out of the burner 42 back into the fuel pump 137.

Figure 13:
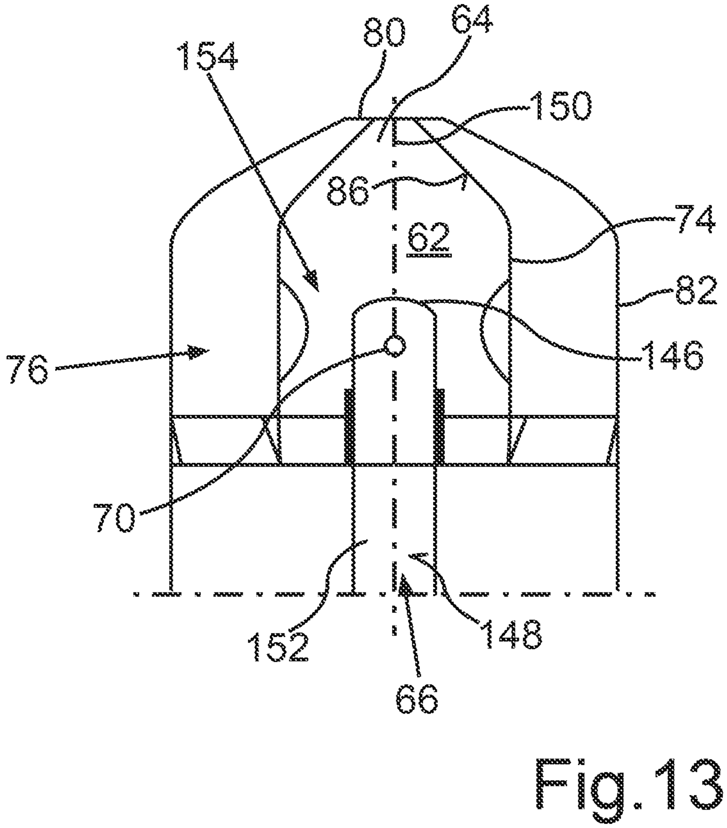
FIG. 13 shows a section of a schematic longitudinal sectional view of a sixth embodiment of the burner.

FIG. 13 shows a section of a schematic longitudinal sectional view of a sixth embodiment of the burner 42, wherein the outflow openings 64 and 80 and thus the component element 82 and the component 74 can in particular be seen in FIG. 6 and in FIG. 12. The injection element 66 can also be seen from FIG. 13, the injection element being designed however according to FIGS. 2 and 7 as a lance in the exemplary embodiment shown in FIG. 13. The exit openings are not arranged or formed on an axial end face 146 of the injection element 66 aligned in the axial direction of the swirl chambers 62 or 76, but the exit openings 70 are aligned in the radial direction of the swirl chambers 62 or 76 and formed in a lateral surface 148 of the injection element 66 on the outer periphery, the lateral surface 148 on the outer periphery of the injection element extending around the axial direction of the peripheral direction running around the axial direction of the respective swirl chamber 62 or 76. In other words, the respective fuel jet 72 does not exit the injection element 66 at the end face 146 and not in the axial direction or not in parallel with the axial direction of the respective swirl chamber 62 or 76, and instead the fuel jet 72 exits the injection element 66 perpendicular or presently obliquely to the axial direction of the respective swirl chamber 62 or 76 depicted by a dashed line 150 in FIG. 13.

The lateral surface 86 on the internal periphery of the component 74 is also described as a film wall, as the fuel that is injected out of the injection element 66 via the exit openings 70 and is applied or injected against the film wall forms the previously specified film or fuel film on the film wall (lateral surface 86 on the internal periphery). To apply the fuel particularly advantageously on or against the film wall, a simple lance, e.g., the injection element 66 shown in FIG. 13, can for example be used instead of an atomizing nozzle. The lance comprises a tube 152, in the end region of which the at least two exit openings 70, for example designed as transverse holes, are applied. The fuel does not exit the lance or the tube 152 in the axial direction of the respective swirl chamber 62 or 76, and instead exits in the radial direction or obliquely to the radial direction of the respective swirl chamber 62 or 76. So that the fuel exiting the exit openings 70 can be particularly effectively applied on the prefilmer and in particular on or against the film wall, it is advantageous if the fuel is atomized. For this purpose, it is preferably provided that if a venturi nozzle 154 is arranged on or at the film wall also described as a prefilmer wall, the venturi nozzle is in particular arranged at the height of the exit openings 70 in the axial direction of the respective swirl chamber 62 or 76 of which the respective axial direction coincides with the axial direction and with the longitudinal extension direction of the injection element 66, in particular of the tube 152, the exit openings preferably being arranged at the same height in the axial direction. In other words, the venturi nozzle 154 is preferably provided in the swirl chamber 62 in which the exit openings 70 are also arranged, the narrowest flow cross-section of which venturi nozzle that can be flowed through by the first part of the air preferably being arranged in the axial direction of the respective swirl chamber 62 or 76, and thus of the injection element 66 such that the narrowest or smallest or lowest flow cross-section of the venturi nozzle 154 and the respective exit opening 70 are arranged at the same height in the axial direction of the respective swirl chamber 62 or 76 and thus in the axial direction of the injection element 66. A particularly advantageous atomization of the fuel flowing through the exit openings 70 can thus be obtained. The venturi nozzle 154 and the injection element 66 can in particular function as a kind of jet pump. The first part of the air flows through the venturi nozzle 154, i.e., through its narrowest flow cross-section. As the exit openings 70 are respectively at least partially arranged in the narrowest flow cross-section of the venturi nozzle 154, i.e., as the narrowest flow cross-section of the venturi nozzle 154 and the exit openings 70 are arranged at the same height in the axial direction of the injection element 66 and thus the flow direction of the first part of the air flowing through the venturi nozzle 154, the first part of the air acts or functions as a propellant that suctions the fuel as a suction medium, so to say, in particular via the exit openings 70, such that the propellant suctions the suction medium (fuel) through the exit openings 70, so to say. The fuel is thus particularly advantageously atomized in the swirl chamber 62.

Figure 14:
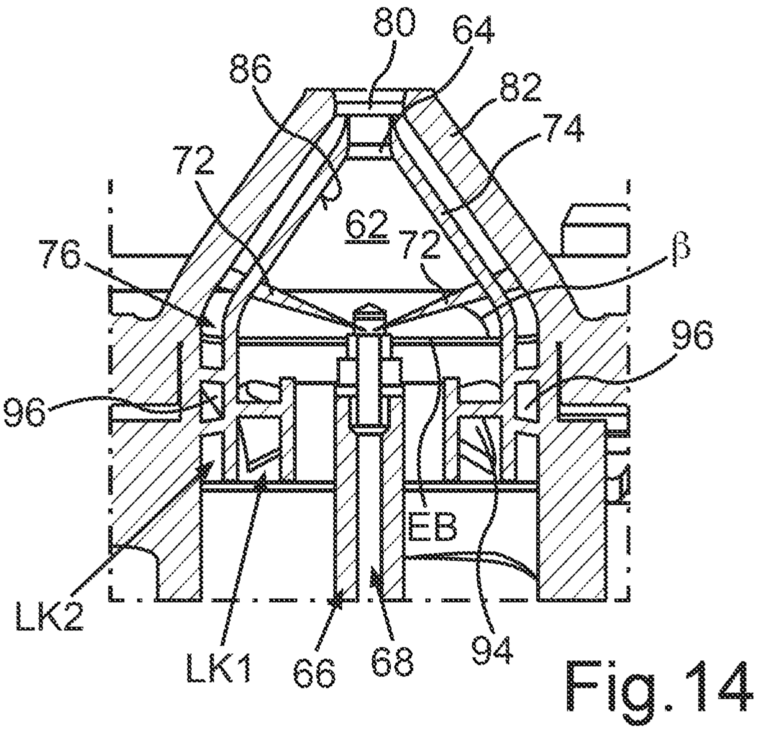
FIG. 14 shows a section of a schematic longitudinal sectional view of a seventh embodiment of the burner.

FIG. 14 shows a section of a seventh embodiment of the burner in a schematic longitudinal sectional view. In the seventh embodiment, the injection element 66 is for example designed as a lance. It can be seen that the respective fuel jet 72, in particular its longitudinal axis or longitudinal central axis, forms an angle β, also described as a jet angle, with an imaginary plane EB running perpendicular to the axial direction of the respective swirl chamber 62 or 76, and thus perpendicular to the respective flow direction of the respective part of the air flowing through the respective swirl chamber 62 or 76. The axial direction of the respective swirl chamber 62 or 76 coincides with the longitudinal extension direction or longitudinal extension of the injection element 66, and thus with its axial direction. The exit openings 70 are arranged distributed and spaced apart from one another in the peripheral direction running around the axial direction of the injection element 66, in particular equally. To generate as thin and as even a fuel film as possible on the prefilmer, i.e., on the lateral surface 86 on the internal periphery, the number of exit openings 70 is preferably at least 2 and at most 10. In other words, it is for example provided that the number of exit openings 70 lies in a range of 2 to 10 inclusive. For example, it is preferably provided that the angle β lies in a range of 10° to 60° inclusive, in particular to direct a surge of the fuel as early as in the flow direction. In addition, it is provided that the respective, preferably circular exit opening 70 that is for example designed as a hole has a diameter, in particular an inner diameter, that lies in a range of 50 mm to 3 mm inclusive.

Figure 15:
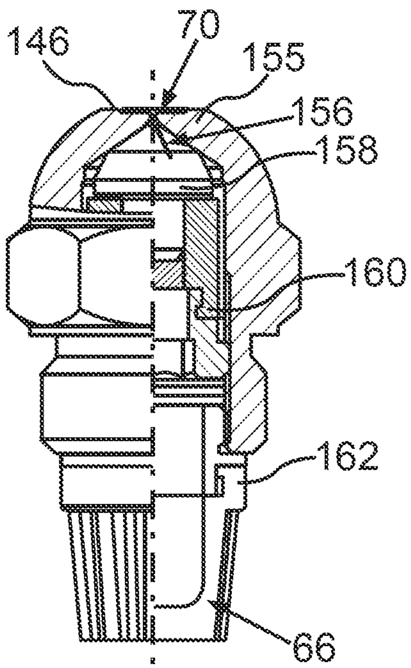
FIG. 15 shows a schematic and partially sectional side view of an injection element of the burner.

FIG. 15 shows a possible further embodiment of the injection element 66 in a schematic and partially sectional side view. In the exemplary embodiment shown in FIG. 15, the injection element 66 is designed as an injection nozzle, as is used in fuel oil burners. In the exemplary embodiment shown in FIG. 15, the injection element 66 has a head 155, a swirl slit 156, a vortex body 158, a secondary filter 160 and a primary filter 162. The injection element 66 according to FIG. 15 has at least or exactly one exit opening 70, wherein the exit opening 70 of the injection element 66 is designed or formed on its axial end face 146, which is also described as an axial end surface. This means that the fuel jet 72 flowing through the exit opening 70 in the axial direction of the injection element 66, and thus of the respective swirl chamber 62 or 76, exits the exit opening 70, and thus the injection element 66. In other words, according to FIG. 15, the fuel jet 72 or its longitudinal axis or longitudinal central axis runs at least substantially in the axial direction, i.e., in parallel with the axial direction of the respective swirl chamber 62 or 76.

Figure 16:
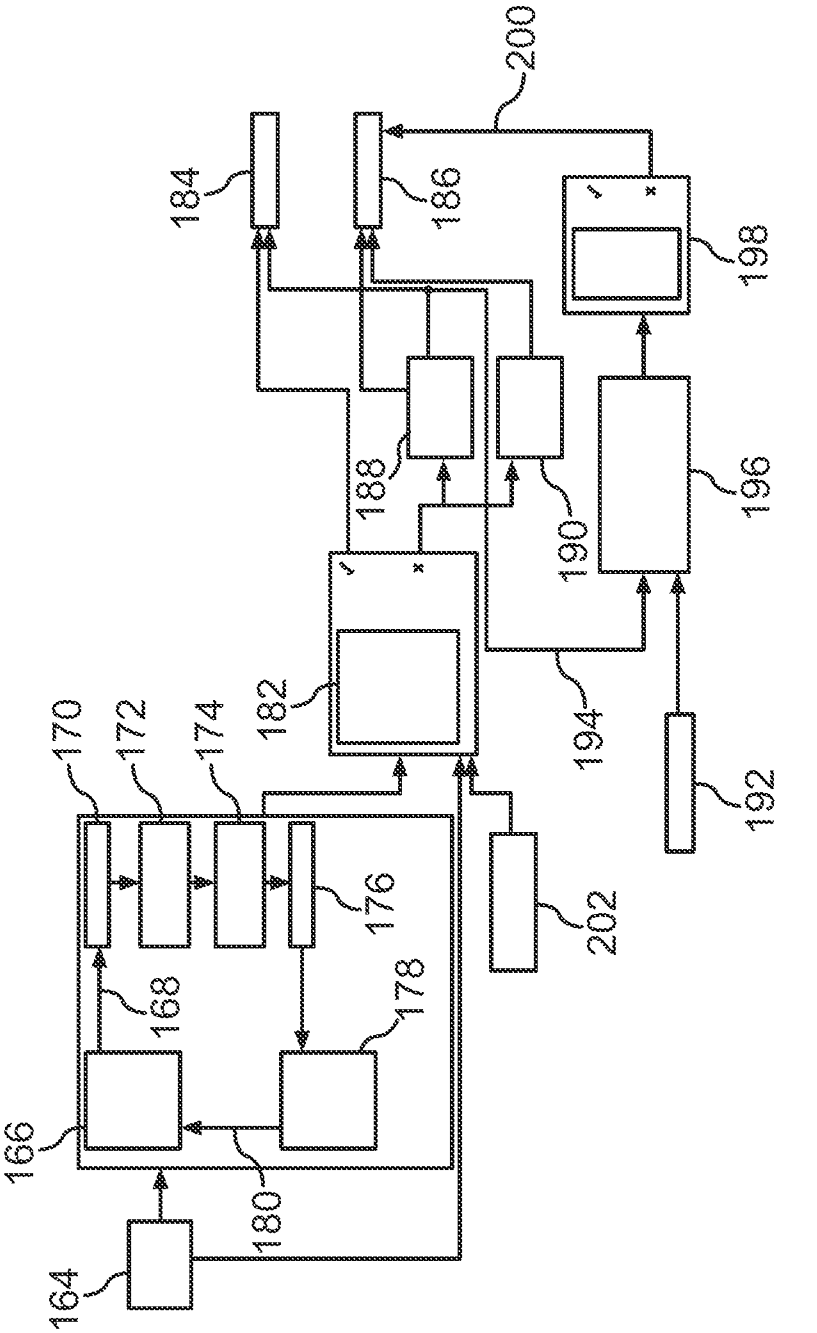
FIG. 16 shows a block diagram to depict an operation of the burner.

FIG. 16 shows a block diagram for depicting an operation, in particular a regulation of the burner 42. A temperature of the exhaust gas at the introduction point E2 or downstream of the introduction point E2 and in particular upstream of the component 36*b* is labelled T5. For example, the temperature T5 is measured, in particular by means of a temperature sensor, such that for example a value, also described as a T5 value, that characterizes the temperature T5 is measured. The T5 value is depicted by a block 164 in FIG. 16. The T5 values is transferred to a block 166, in particular as an input parameter. The block 166 depicts an initial state in which, for example, an air feed into the burner 42 is closed, the fuel pump is deactivated, such that a fuel feed into the burner 42 is also deactivated and the ignition device 60 is deactivated. An arrow 168 depicts a so-called burner release, i.e., a release of the burner. As a consequence of the burner release, the ignition device 60 is switched on, i.e., activated, in a block 170. In a block 172, a fuel-air ratio of the mixture of 0.9 is for example set to thus obtain a starting operation of the burner 42. In addition, in the block 172, the air pump is for example activated and the fuel pump is activated. The fuel-air ratio of the mixture is then adjusted to 1.03 in a block 174, for example, wherein the fuel pump is operated at a low frequency. In a block 176, the ignition device 60 is for example deactivated. A block 178 depicts an operating state of the burner 42. In the operating state, an air feed to or into the burner 42 is opened, and the fuel pump is switched on and the ignition device 60 is deactivated such that the burner 42 is supplied with the air and the fuel. An arrow 180 indicates that the burner release is withdrawn, in particular if the temperature T5 is greater than a limit value that is 400° C., for example.

In a block 182, a comparison in which an actual value of the temperature T5 is compared with a target value of the temperature T5 is implemented. The actual value of the temperature T5 is for example the previously specified T5 value, and/or for example the actual value of the temperature T5 is measured, in particular by means of the previously specified temperature sensor, in particular at the introduction point E2 or at a point in the exhaust gas tract 26 arranged downstream of the introduction point E2, and in particular upstream of the component 36*b*. If, for example, the comparison yields that the actual value is less than or equal to the target value, then a state adjusted in particular in the block

174 is maintained, in particular with regard to the operation of the fuel pump and the air pump, wherein the fuel pump is depicted in FIG. 16 by a block 184 and the air pump by a block 186. If, for example, the actual value is greater than the target value, then in the block 188, a control of the fuel pump is implemented, in particular by means of an electronic computer also described as a control device, and/or a control of the air pump is implemented in a block 190, in particular via the control device, in particular continuously, such that the fuel pump or the air pump is changed with regard to its respective operation, in particular such that the actual value is reduced, until for example the actual value corresponds to the target value or is smaller than the target value.

In a block 192, the quantity of the air of the mixture is determined, in particular measured, in particular via an air flow measurement. It is additionally depicted via an arrow 194 that the quantity of the fuel is determined, in particular measured. In a block 196, the fuel-air ratio (γ) is determined, in particular calculated, depending on the determined, in particular measured quantity of the air and depending on the determined, in particular measured or calculated quantity of the fuel. In particular, in the block 196, an actual value of the fuel-air ratio of the mixture is determined, in particular calculated. In a block 198, the actual value of the fuel-air ratio is compared with a second target value of the fuel-air ratio, wherein the second target value is for example 1.03. If the actual value of the fuel-air ratio corresponds to the target value of the fuel-air ratio, or if the actual value of the fuel-air ratio deviates from the target value of the fuel-air ratio only such that a difference between the actual value of the fuel-air ratio and the target value of the fuel-air ratio is in particular larger in magnitude or equal to a limit, then a current operation of the burner 42, in particular of the fuel pump and of the air pump is maintained. If, however, the actual value of the fuel-air ratio deviates excessively from the target value of the fuel-air ratio, then, as depicted in particular by an arrow 200, the air pump and/or the fuel pump is changed with regard to its respective operation, in particular by controlling the fuel pump or the air pump, in particular such that the difference between the actual value of the fuel-air ratio and the target value of the fuel-air ratio is at least reduced or even eliminated. Finally, a block 202 depicts that the target value of the temperature T5 is predetermined by or from the control device, in particular in the block 182. As an alternative or in addition, the control device can predetermine or emit the target value of the fuel-air ratio, in particular in the block 198.

Figure 18:
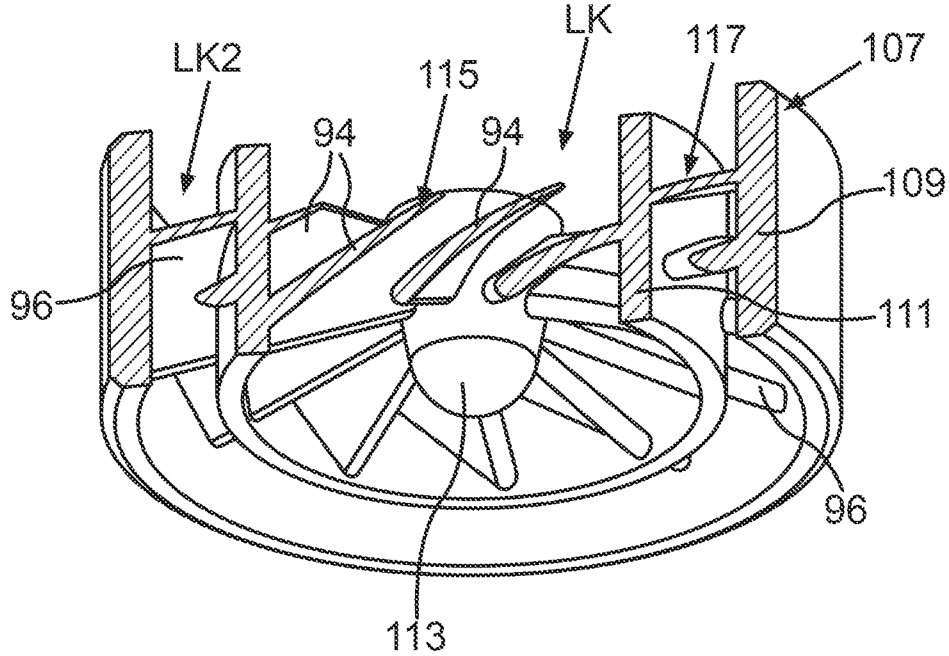
FIG. 18 shows a schematic and sectional perspectival view of a swirl generation apparatus of the burner.

FIG. 18 shows the swirl generation apparatus 107 of the burner 42 in a schematic and partially sectional perspectival view. The air conduits LK1 and LK2 can be seen particularly clearly from FIG. 18. The outer air conduit LK2 is delimited outwards in the radial direction of the respective swirl chamber 62 or 76 by a first wall 109, designed in particular as a solid body, of the swirl generation apparatus 107, of which the wall 109 for example runs completely in the peripheral direction of the respective swirl chamber 62 or 76, and thus completely continuously surrounds the air conduit LK2. The outer air conduit LK2 is delimited inwards in the radial direction of the respective swirl chamber 62 or 76 by a second wall 111, in particular designed as a solid body, of the swirl generation apparatus 107, of which the wall 111 preferably runs around completely in the peripheral direction of the respective swirl chamber 62 or 76, and thus completely surrounds the air conduit LK1. It can in particular be seen that the respective air conduit LK1 or LK2 is at least substantially annular in shape per se, and is thus designed as an annular conduit. The air conduit LK1 is delimited inwards in the radial direction of the respective swirl chamber 62 or 76 by a body 113, designed in particular as a solid body, of the swirl generation apparatus 107, wherein—as is explained in more detail in the following—the body 113 is an air guidance body. For example, the swirl generation apparatus 107 is designed as one part, such that it is conceivable that the walls 109 and 111 are designed as one part with one another and/or the wall 109 and/or 111 is designed as one part with the body 113.

The swirl generation apparatus 107 comprises an inner first swirl generation device 115, which comprises the first, inner swirl generation element 94. In the exemplary embodiment shown in FIG. 18 too, the swirl generation elements 94 are designed in particular as guide vanes that are at least partially bent or bend-shaped, wherein the air flowing through the air conduit LK1, i.e., the first part of the air, is guided, deflected or diverted by means of the swirl generation elements 94 such that the turbulent first flow of the first part of the air can be or is caused by means of the swirl generation elements 94, and thus by means of the swirl generation device 115. It is in particular conceivable that the respective swirl generation element 94 is designed as one part with the wall 109 and/or 111 and/or as one part with the body 113. It can be seen that the swirl generation elements 94 are arranged in the air conduit LK1, wherein the swirl generation elements 94 are arranged in the peripheral direction of the respective swirl chamber 62 or 76, and thus arranged one after another and in particular spaced apart from one another in the peripheral direction of the swirl generation apparatus 107.

The swirl generation apparatus 107 comprises the swirl generation device 115 that is arranged in the air conduit LK1 and that has the swirl generation elements 94, and an outer, second swirl generation device 117 that is arranged in the air conduit LK2 and that has the second, outer swirl generation elements 96. The swirl generation elements 96 are thus arranged in the air conduit LK2, wherein the swirl generation elements 96 are arranged in the peripheral direction of the respective swirl chamber 62 or 76, and thus arranged one after another and in particular spaced apart from one another in the peripheral direction of the swirl generation apparatus 107. The part of the air flowing through the air conduit LK2 is diverted, deflected or guided by means of the swirl generation elements 96, i.e., by means of the swirl generation device 117, such that the second turbulent flow of the second part of the air is caused. The respective swirl generation element 96 is preferably designed as one part with the wall 109 and/or 111 and/or as one part with the body 113 and/or as one part with the respective swirl generation element 94, such that the swirl generation apparatus 107 is preferably designed as one part as a whole. In the exemplary embodiment shown in FIG. 18, the respective swirl generation element 96 is also designed as a guide vane or air guide vane, which is at least partially bent or bend-shaped, and thus has a bend-shaped course. The number of first inner swirl generation elements 94 is preferably in a range of six to eleven inclusive. The number of second, outer swirl generation elements 96 preferably lies in a range of eight to 14 inclusive.

The respective air conduit LK1 or LK2 per se, i.e., when considering the respective air conduit LK1 or LK2 without the swirl generation elements 94 or 96 has a surface area also described as a through cross-section, in particular upstream of the respective swirl generation device 115 or 117 and/or downstream of the respective swirl generation device 115 or 117. As the respective air conduit LK1 or LK2 per se is presently annular in shape, the respective surface area is a respective surface area of an annular surface. It is preferably provided that the respective swirl generation elements 94 or 96 cover or block at least 20 percent and at most 60 percent of the surface area of the respective air conduit LK1 or LK2 per se arranged upstream and/or downstream of the respective swirl generation device 115 or 117, whereby a particularly advantageous swirl generation can be obtained. The body 113, which is a central body, is closed, and thus cannot be flowed through by air. The body 113 per se is additionally designed rotationally symmetrically with regard to its longitudinal axis or longitudinal central axis, which coincides with the axial direction of the respective swirl chamber 62 or 76, and thus with the axial direction of the swirl generation apparatus 107. In particular, the body 113 is presently designed as an in particular central and/or closed profile.

The respective swirl generation element 94 or 96 for example forms the angle β with the previously specified imaginary plane EB, which angle preferably lies in a range of 10 degrees to 45 degrees inclusive. It is further preferably provided that the respective swirl generation element 94 or 96 causes a diversion of the respective part of the air flowing through the respective air conduit LK1 or LK2 at a diversion angle that preferably lies in a range of 70 to 90 degrees inclusive.

To obtain a particularly advantageous mixture preparation, it is preferably provided that the swirl generation device 115, in particular the swirl generation elements 94, runs or is designed contrary to the swirl generation device 117, in particular the swirl generation elements 96, such that the first turbulent flow of the first part of the air has a first direction of rotation, in particular around the respective axial direction of the respective swirl chamber 62 or 76, wherein the second turbulent flow of the second part of the air preferably has a second direction of rotation in particular around the axial direction of the respective swirl chamber 62 or 76, and wherein the first direction of rotation is contrary to the second direction of rotation or vice versa.

Figure 19:
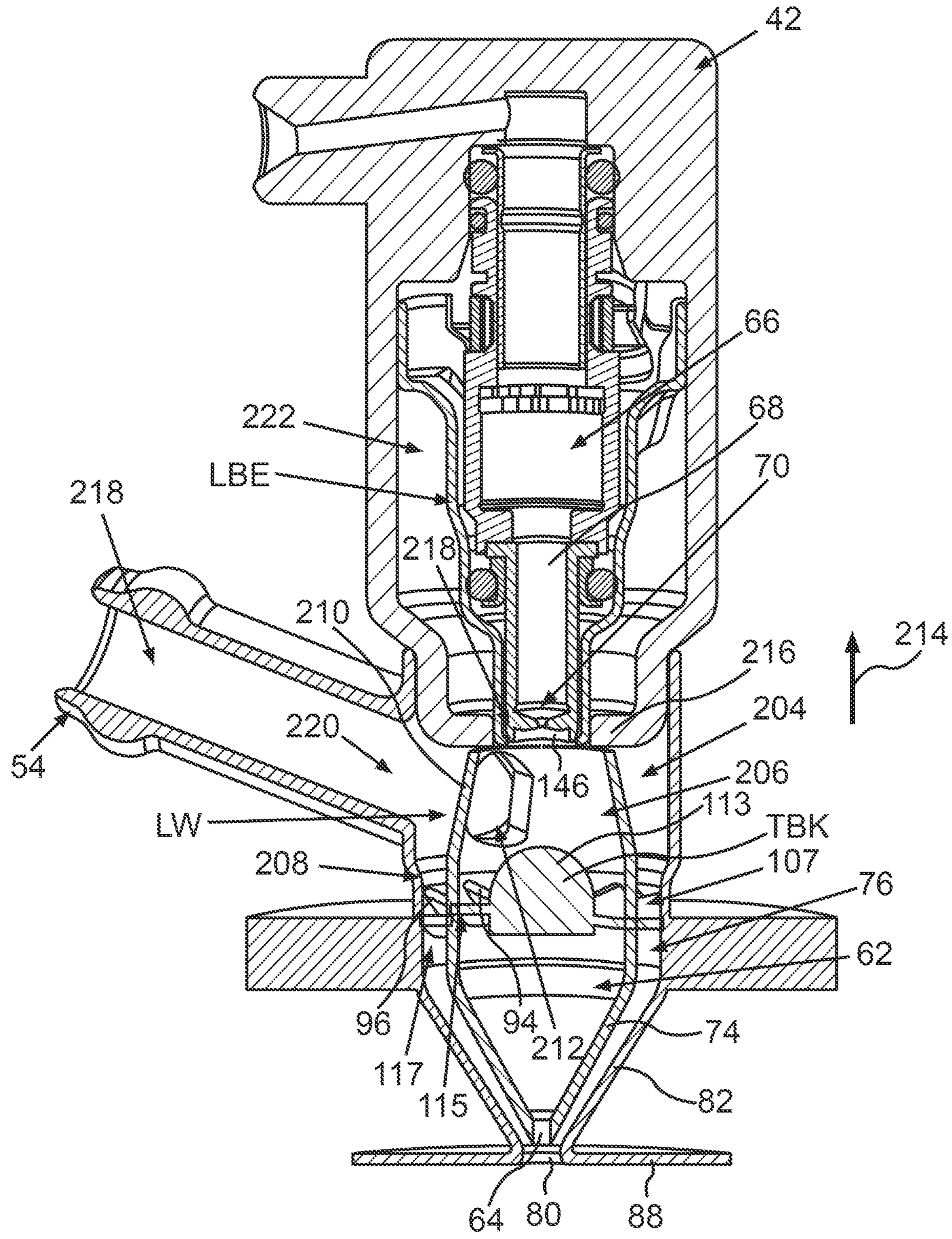
FIG. 19 shows a schematic longitudinal sectional view of a burner.

The swirl generation apparatus 107 is used in particular in an embodiment of the burner 42 shown in particular in FIG. 19, of which the embodiment according to FIG. 19 differs in particular from the previously described embodiments in that the burner 42 has a prechamber labelled with 204 as a whole and formed by a first, inner air feed chamber 206 and a second, outer air feed chamber 208. For this purpose, the burner 42 according to FIG. 19 has a dividing wall 210 designed in particular as a solid body and preferably self-supporting. The dividing wall 210 has at least one longitudinal region LW, which is arranged or runs upstream of the swirl generation devices 115 and 117 of the swirl generation apparatus 107 in the flow direction of the parts of the air flowing through the swirl chambers 62 and 76. The flow direction of the air flowing through the swirl chambers 62 and 76 coincides with the respective axial direction of the respective swirl chamber 62 or 76 or the respective flow direction of the respective part of the air runs in parallel with the respective axial direction of the respective swirl chamber 62 or 76, of which the axial direction coincides with the axial direction of the swirl generation apparatus 107, of the prechamber 204, of the air feed chamber 206 and of the air feed chamber 208. The radial direction of the respective air feed chamber 206 or 208 runs perpendicular to the respective axial direction of the respective air feed chamber 206 or 208. It can be seen from FIG. 19 that the inner, first air feed chamber 206, which is assigned to the inner swirl chamber 62, arranged upstream of the first swirl generation device 115, and via which the first part of the air can be fed to the inner swirl chamber 62 and thus to the swirl generation device 115, is separated by the dividing wall 210 in the radial direction of the air feed chambers 206 and 208, and thus of the swirl chambers 62 and 76, presently except for exactly one overflow opening 212 designed as a through opening and formed in the longitudinal region LW of the dividing wall 210, from the outer air feed chamber 208 which is assigned to the outer swirl chamber 76 and thus to the swirl generation device 117, is arranged upstream of the swirl generation device 117, is fluidically connected to the inner air feed chamber 206 via the overflow opening 212 and surrounds the inner air feed chamber 206 in particular completely continuously in the peripheral direction of the air feed chamber 206, and thus of the swirl chambers 62 and 76, running around the axial direction of the air feed chambers 206 and 208, with the second part of the air being able to be fed to the outer swirl chamber 76 and thus to the outer, second swirl generation device 117 via the outer air feed chamber 208. The longitudinal region LW extends starting from the respective swirl generation device 115 or 117 in a direction contrary to the respective flow direction of the respective part of the air and pointing towards the injection element 66 (introduction element) and running in parallel with the axial direction of the respective swirl chamber 62 or 76, which is depicted in FIG. 19 by an arrow 214, continuously, i.e., without interruption, except for the overflow opening 212, up to a wall 216, designed in particular as a solid body, of the burner 42, a through opening 218 being arranged in the wall 216 of the burner, via which the liquid fuel can be introduced into the inner swirl chamber 62 by means of the injection element 66. This means that the through opening 218 can be flowed through by the fuel flowing through the injection element 66. The longitudinal region LW additionally extends in the peripheral direction around the respective air feed chamber 206 or 208 completely continuously except for the overflow opening 212.

The burner 42 according to FIG. 19 further has a feeding conduit 218 that can be flowed through by the air and which leads directly into the outer air feeding conduit 208, in particular via its conduit opening 220. For example, the feeding conduit 218 is a component of the air supply path 54. The air flowing through the feeding conduit 218, from which the first part and the second part is formed, flows along a flow direction, also described as an entry direction, through the feeding conduit 218, and in particular through the conduit opening 220. In other words, the air flows along the specified entry direction through the conduit opening 22 and thus out of the feeding conduit 218 and into the outer air feed chamber 208. As already previously described, it is preferably provided that the entry direction does not run strictly in the radial direction of the respective swirl chamber 62 or 76, i.e., not strictly perpendicular to the axial direction of the respective swirl chamber 62 or 76, and instead the entry direction preferably runs obliquely to the respective axial direction of the respective swirl chamber 62 or 76, as is the case in FIG. 19. The air can thus be introduced into the outer air feed chamber 208 via the feeding conduit 218 and in particular via its conduit opening 220, the second part of the air being able to be transferred from the outer air feed chamber into the inner air feed chamber 206 via the overflow opening 212. The air introduced into the outer air feed chamber 208 via the feeding conduit 218 and in particular via the conduit opening 220 is thus divided into the parts, i.e., into the first part flowing into the air feed chamber 206 and finally flowing through the air conduit LK1 and the inner swirl chamber 62 and the second part remaining in the air feed chamber 208 and finally flowing through the air conduit LK2 and the swirl chamber 76. A particularly advantageous mixture preparation can thus be obtained.

In the embodiment according to FIG. 19, the introduction element (injection element 66), which is in particular designed as an injection element, has exactly one exit opening 70, via which the introduction element can provide, in particular inject out, the liquid fuel flowing through the introduction element. Via the exit opening 70 that can be flowed through by the liquid fuel flowing through the introduction element, the fuel can thus be removed from the introduction element, and the introduction element leads directly into the first inner air feed chamber 206 via the exit opening 70. In other words, the conduit 68 that can be flowed through by the liquid fuel has the exit opening 70 and leads directly into the air feed chamber 206 via the exit opening 70, and thus not into the swirl chamber 62 and not into the swirl chamber 76, such that the exit opening 70 is arranged upstream of the swirl chamber 62 and outside of the swirl chamber 62 in the flow direction of the respective part of the air. Thus, for example, the introduction element (injection element 66) can inject the fuel directly into the air feed chamber 206 via the exit opening 70. The exit opening 70 is formed in the axial end face 146 of the introduction element, of which the axial end face 146 faces the air feed chamber 206 or the body 113 in the axial direction of the swirl chambers 62 and 76 and thus of the air feed chambers 206 and 208, of which the axial direction coincides with the axial direction of the introduction element and with the longitudinal extension direction of the latter.

It can further be seen from FIG. 19 that the body 113, in particular at least one partial region TBK of the body 113, is arranged in the inner air feed chamber 206 and faces the introduction element, in particular the end face 146 and thus the exit opening 70, in the direction depicted by the arrow 214. The body 113 is convexly domed at least in its partial region TBK towards the introduction element, in particular towards the end face 146, and is in particular spherical in shape or spherical segment-shaped. The air or the first part of the air, which flows in the direction of the swirl chamber 62, can thus flow towards the partial region TBK and be guided by means of the partial region TBK to the swirl generation device 115 in a manner particularly favourable to flow. The body 113, in particular the partial region TBK, is arranged between the swirl generation device 115 in the radial direction of the respective swirl chamber 62 or 76 and thus in the radial direction of the swirl generation apparatus 107. This should in particular be understood to mean that the swirl generation elements 194 are arranged one after the other in the peripheral direction of the respective swirl chamber 62 or 76 and thus in the peripheral direction of the body 113 over the periphery of the latter and are in particular equally distributed.

Overall, it can be seen that the dividing wall 210 is an air division pipe or is formed by an air division pipe, by means of which the air feed chambers 206 and 208 are separated from one another in the radial direction. The overflow opening 212, for example designed as a hole, is provided, via which the first part of the air can flow out of the outer air feed chamber 208 into the inner air feed chamber 206.

The burner 42 according to FIG. 19 additionally has a cooling jacket 222, presently designed as a water jacket or water cooling jacket, which surrounds at least one longitudinal region LBE of the introduction element in the peripheral direction of the respective swirl chamber 62 or 76 and thus in the peripheral direction of the introduction element, in particular completely continuously. The cooling jacket 222 can be flowed through by a cooling fluid preferably in the form of a liquid and at least partially, in particular at least substantially or completely formed by water, by means of which cooling fluid the introduction element can be particularly advantageously cooled.

Figure 20:
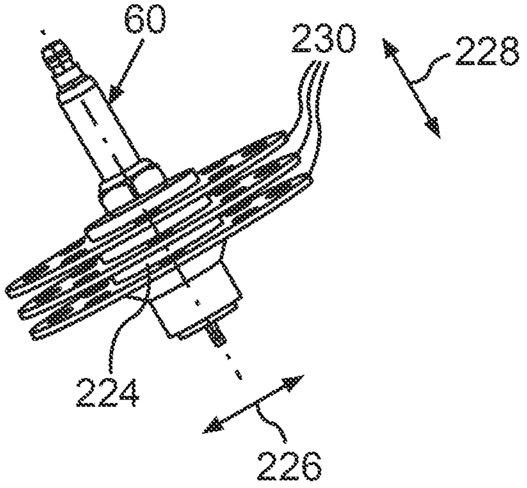
FIG. 20 shows a schematic side view of an ignition device of the burner.

FIG. 20 shows a possible embodiment of the ignition device 60 for example designed as a spark plug in a schematic side view. It can be seen from FIG. 20 that the ignition device 60 has several cooling ribs 230 protruding outwards in the radial direction of the ignition device 60 from a base body 224 of the ignition device 60, of which the radial direction is depicted in FIG. 20 by a double arrow 226 and runs perpendicular to the longitudinal extension direction of the ignition device 60, and spaced apart from one another in the longitudinal extension direction of the base body 224, of which the longitudinal extension direction is depicted by a double arrow 228 in FIG. 20 and coincides with the longitudinal extension direction of the ignition device 60 as a whole, the ignition device 60 being able to be cooled particularly advantageously by means of the cooling ribs.

Figure 21:
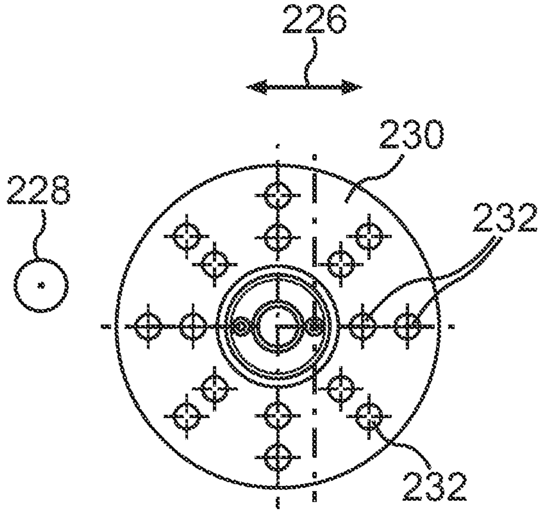
FIG. 21 shows a schematic front view of the ignition device.
Figure 22:
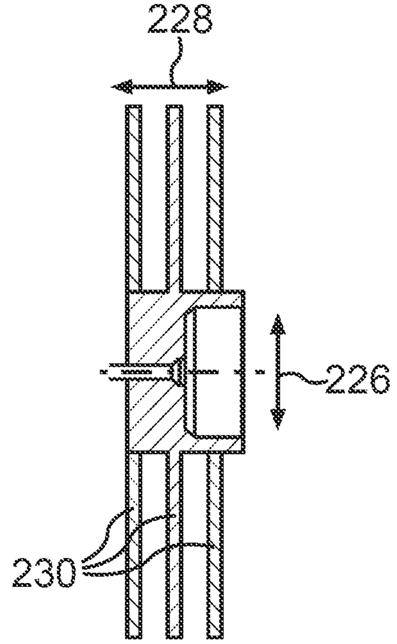
FIG. 22 shows a section of a schematic longitudinal sectional view of the ignition device.

It can be seen from FIG. 21 that at least one of the cooling ribs 230, preferably the respective cooling rib 230, has through openings 232, which are for example designed as holes and/or can be circular. The cooling ribs, and in particular their spacing, can be seen particularly clearly from FIG. 22.

Figure 23:
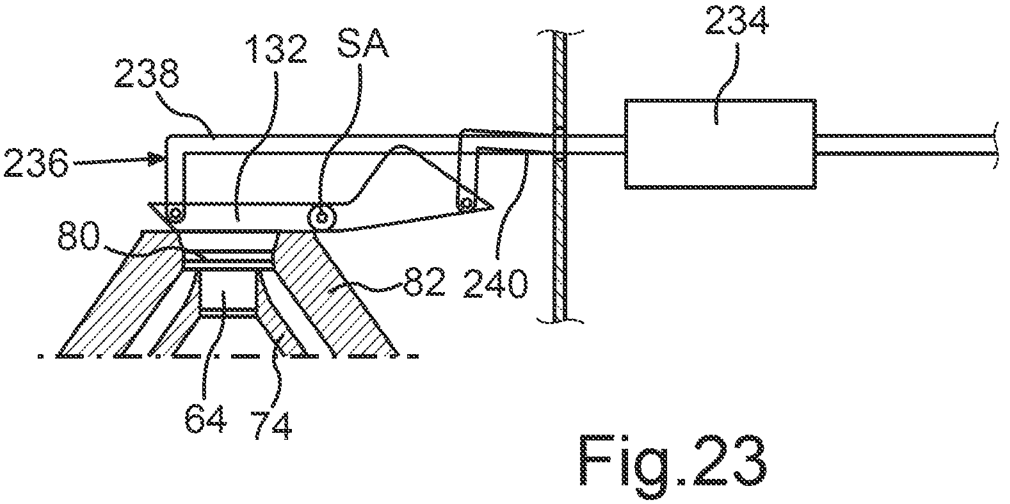
FIG. 23 shows a section of a schematic sectional view of the burner according to a second embodiment.

Finally, FIG. 23 shows a section of a further embodiment of the burner 42 in a schematic sectional view. The burner 42 has the closing element 132, which can be moved relative to the outflow openings 64 and 80 and relative to the component 74 and relative to the component element 82 between the open position shown in FIG. 12 and the closed position shown in FIG. 23. In the closed position, the outflow opening 80 is closed, i.e. fluidically blocked, by means of the closing element 132, wherein in the closed position, the closing element 132 is at least partially arranged in the outflow opening 80. In the exemplary embodiment shown in FIG. 23, the closing element 132 penetrates the outflow opening 80 and protrudes into the outflow opening 64. As the outflow opening 80 is closed by means of the closing element 132 in the closed position, and as the outflow opening 80 is arranged downstream of the outflow opening 64 in the flow direction of the air, i.e., in the flow direction of the respective part of the air, no particles and no gases from the combustion chamber 58 can flow through the outflow opening 80 if the closing element 132 is in its closed position, such that, furthermore, no particles and no gases from the combustion chamber 58 can flow through the outflow opening 64. Both the air supply path 54 and the fuel supply path 46 can thus be protected from impurities due to gases and/or particles from the combustion chamber 58. According to FIG. 12, the closing element 132 can for example be moved along an element direction running in parallel with the axial direction of the respective swirl chamber 62 or 76 or coinciding with the respective axial direction of the respective swirl chamber 62 or 76 between the closed position and the open position. According to FIG. 23, the closing element 132 can be pivoted around a pivot axis SA running through a rotation point between the closed position and the open position relative to the outflow openings 64 and 80, and thus relative to the component 74 and relative to the component element 82. An actuator 234 that can for example be operated electrically and/or pneumatically and/or hydraulically is for example assigned to the closing element 132, the closing element 232 being able to be moved, in particular pivoted, between the closed position and the open position by means of the actuator 234. For this purpose, the actuator 234 is coupled with the closing element 132 via a lever arrangement 236, in particular in a hinged manner. For example, the actuator 234 can move and thus shift lever elements 238 and 240 of the lever arrangement 236 at least translationally, wherein the lever elements 238 and 240 can be at least indirectly or directly coupled with the closing element 132 in a hinged manner. Translational movements of the lever elements 238 and 240 are thus transformed into a pivot movement of the closing element 132, for example, whereby the closing element 132 can be pivoted between the closed position and the open position.

LIST OF REFERENCE CHARACTERS

10 drive device
12 internal combustion engine
14 engine block
16 cylinder
18 tank
20 low-pressure pump
22 high-pressure pump
24 intake tract
26 exhaust gas tract
28 exhaust gas turbocharger
30 compressor
32 turbine
34 shaft
36*a-d* component
38 dosing device
40 mixing chamber
42 burner
44 flame
46 fuel supply path
48 fuel conduit
50 valve element
52 electronic computer
54 air supply path
55 valve element
56 pump
58 combustion chamber
60 ignition device
62 inner swirl chamber
64 first outflow opening
66 injection element
68 conduit
70 exit opening
72 fuel jet
74 component
76 outer swirl chamber
78 dividing wall
80 second outflow opening
82 component element
84 atomizing lip
86 lateral surface on the internal periphery
88 anti-recirculation plate
90 throughflow opening
92 supply chamber
94 swirl generator
96 swirl generator
98 throughflow opening
100 perforated disc
102 removal opening
104 arrow
106 turbulent flow
107 swirl generation apparatus
108 through opening
109 wall
110 closing device
111 wall
112 closing element
113 body
114 opening cross-section
115 swirl generation device
116 chamber element
117 swirl generation device
118 lateral surface on the internal periphery
120 chamber part
122 chamber part
124 clearance
126 dashed line
128 exit cone
130 double arrow
132 closing element
134 thread
136 electrode
137 fuel pump
138 piston
140 valve
142 spring
144 ball
146 end face
148 lateral surface
150 dashed line
152 tube
154 venturi nozzle
155 head
156 swirl slit
158 vortex body
160 secondary filter
162 primary filter
164 block
166 block
168 arrow
170 block
172 block
174 block
176 block
178 block
180 arrow
182 block
184 block
186 block
188 block
190 block
192 block
194 arrow
196 block
198 block
200 arrow
202 block
204 prechamber
206 inner air feed chamber
208 outer air feed chamber
210 dividing wall
212 overflow opening
214 arrow
216 wall
218 feeding conduit
220 conduit opening
222 cooling jacket
224 base body
226 double arrow
228 double arrow
230 cooling rib

232 through opening
234 actuator
236 lever arrangement
238 lever element
240 lever element
E1 introduction point
E2 introduction point
V1 connection point
V2 connection point
T1 part
T2 part
T part
K end edge
LK1 air conduit
LK2 air conduit
K1 annular surface
K2 annular surface
TB part
Di outer diameter
Da outer diameter
W wall region
R radius
α angle
l1 length
d1 inner diameter
d2 inner diameter
L1 longitudinal region
β angle
EB plane
LW longitudinal region
TBK partial region
LBE longitudinal region

The invention claimed is:

1. A burner (42) for an exhaust gas tract (26) that is flowable through by exhaust gas of an internal combustion engine (12) of a motor vehicle, comprising:

a combustion chamber (58) in which a mixture comprising air and a liquid fuel is ignitable and combustible;

an inner swirl chamber (62) that is flowable through by a first part of the air, wherein the inner swirl chamber (62) has a first swirl generation device (115) that causes a turbulent flow of the first part of the air and has a first outflow opening (64) that is flowable through by the first part of the air flowing through the inner swirl chamber (62) and via which the first part of the air is removable from the inner swirl chamber (62);

an introduction element (66) that is flowable through by the liquid fuel and via which the liquid fuel is introducible into the inner swirl chamber (62), wherein the first outflow opening (64) is flowable through by liquid fuel removed from the introduction element (66);

an outer swirl chamber (76) that surrounds at least one longitudinal region of the inner swirl chamber (62) in a peripheral direction of the inner swirl chamber (62), wherein the outer swirl chamber (76) is flowable through by a second part of the air, wherein the outer swirl chamber (76) has a second swirl generation device (117) that causes a turbulent flow of the second part of the air and has a second outflow opening (80) that is flowable through by the second part of the air flowing through the outer swirl chamber (76), by liquid fuel flowing through the first outflow opening (64), and by the first part of the air flowing through the inner swirl chamber (62) and the first outflow opening (64), and wherein the first part of the air and the second part of the air and the liquid fuel are introducible into the combustion chamber (58) via the second outflow opening (80);

a dividing wall (210) that has a longitudinal region (LW) disposed upstream of the first swirl generation device (115) and the second swirl generation device (117) in a flow direction of the first part of the air flowing through the inner swirl chamber (62) and the second part of the air flowing through the outer swirl chamber (76);

wherein an inner air feed chamber (206) is separated from an outer air feed chamber (208) by the longitudinal region (LW) except for exactly one overflow opening (212) formed in the longitudinal region (LW);

wherein the inner air feed chamber (206) is assigned to the inner swirl chamber (62) and is disposed upstream of the first swirl generation device (115) and wherein the first part of the air is feedable to the inner swirl chamber (62) via the inner air feed chamber (206);

wherein the outer air feed chamber (208) is assigned to the outer swirl chamber (76), is disposed upstream of the second swirl generation device (117), is fluidically connected to the inner air feed chamber (206) via the overflow opening (212), and surrounds the inner air feed chamber (206) in a peripheral direction of the inner air feed chamber (206) and wherein the second part of the air is feedable to the outer swirl chamber (76) via the outer air feed chamber (208); and a feeding conduit (218) that is flowable through by the air and which leads into the outer air feed chamber (208), wherein the air is introducible into the outer air feed chamber (208) via the feeding conduit (218), wherein the first part of the air is transferrable into the inner air feed chamber (206) from the outer feed chamber (208) via the overflow opening (212), and wherein the air introduced into the outer air feed chamber (208) is dividable into the first part of the air and the second part of the air.

2. The burner (42) according to claim 1, wherein the introduction element (66) has an exit opening (70) that is flowable through by the liquid fuel and via which the liquid fuel is removable from the introduction element (66) and wherein the introduction element (66) leads directly into the inner air feed chamber (206).

3. The burner (42) according to claim 2, further comprising a guidance body (113) that is disposed in the inner air feed chamber (206) and faces the introduction element (66), wherein the guidance body (113) is convexly domed towards the introduction element (66) and is disposed at least partially upstream of the first swirl generation device (115).

4. The burner (42) according to claim 1, wherein the first outflow opening (64) ends in a flow direction of the first part of the air flowing through the first outflow opening (64) on an end edge (K) machined in a targeted manner that is formed by an atomizing lip (84) that tapers in the flow direction of the first part of the air flowing through the first outflow opening (64) up to the end edge (K) and ends on the end edge (K).

5. The burner (42) according to claim 4, wherein the end edge (K) is mechanically machined.

6. The burner (42) according to claim 1, further comprising a cooling jacket (222) surrounding at least one longitudinal region (LBE) of the introduction element (66) in a peripheral direction of the introduction element (66), wherein the cooling jacket is flowable through by a cooling fluid.

7. The burner (42) according to claim 6, wherein the cooling fluid is a liquid.

8. The burner (42) according to claim 1, further comprising an ignition device (60) with a plurality of cooling ribs (230), wherein the plurality of cooling ribs (230) protrude outward in a radial direction of the ignition device (60) from a base body (224) of the ignition device (60) and are spaced apart from one another in a longitudinal extension direction (228) of the base body (224).

9. The burner (42) according to claim 8, wherein a cooling rib (230) of the plurality of cooling ribs (230) has a plurality of through openings (232).

10. The burner (42) according to claim 1, further comprising a closing element (132) that is movable relative to the first outflow opening (64) and the second outflow opening (80) between a closed position fluidically blocking at least one of the first outflow opening (64) and the second outflow opening (80) and an open position releasing the at least one of the first outflow opening (64) and the second outflow opening (80).

* * * * *